US009579573B2

(12) United States Patent
Rath et al.

(10) Patent No.: US 9,579,573 B2
(45) Date of Patent: *Feb. 28, 2017

(54) SYSTEMS AND METHODS FOR CREATING A PLAYABLE VIDEO GAME FROM A THREE-DIMENSIONAL MODEL

(71) Applicant: Pixel Press Technology, LLC, St. Louis, MO (US)

(72) Inventors: Robin Rath, St. Louis, MO (US); John Haney, Wildwood, MO (US)

(73) Assignee: Pixel Press Technology, LLC, St. Louis, MO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/533,771

(22) Filed: Nov. 5, 2014

(65) Prior Publication Data

US 2015/0128104 A1    May 7, 2015

Related U.S. Application Data

(63) Continuation-in-part of application No. 14/273,267, filed on May 8, 2014, now Pat. No. 9,370,721.

(60) Provisional application No. 61/909,836, filed on Nov. 27, 2013, provisional application No. 61/833,336, (Continued)

(51) Int. Cl.
*G06F 9/44* (2006.01)
*A63F 13/60* (2014.01)
*A63F 13/65* (2014.01)
*A63F 13/213* (2014.01)

(52) U.S. Cl.
CPC ............ *A63F 13/60* (2014.09); *A63F 13/213* (2014.09); *A63F 13/65* (2014.09); *G05B 2219/13144* (2013.01); *G05B 2219/23258* (2013.01); *G05B 2219/23291* (2013.01); *G06F 8/20* (2013.01); *G06F 8/34* (2013.01)

(58) Field of Classification Search
CPC ... G06F 8/34; G06F 8/20; G05B 2219/23258; G05B 2219/13144; G05B 2219/23291
See application file for complete search history.

(56) References Cited

U.S. PATENT DOCUMENTS

| 5,680,534 A | 10/1997 | Yamato et al. |
| 5,742,280 A | 4/1998 | Ohyama |
| 6,167,562 A | 12/2000 | Kaneko |

(Continued)

FOREIGN PATENT DOCUMENTS

WO   2006/023268 A2   3/2006

OTHER PUBLICATIONS

Shane Dielschneider, Representing Information using Parametric Visual Effects on Groupware Avatars, Dec. 2009, retrieved online on Sep. 30, 2016, pp. 1-116.*

(Continued)

*Primary Examiner* — Thuy Dao
*Assistant Examiner* — Hanh T Bui
(74) *Attorney, Agent, or Firm* — Lewis Rice LLP

(57) ABSTRACT

Systems and methods for creating a playable video game, or playable video game levels, from a three-dimensional model comprising a plurality of various-colored blocks disposed on a grid. A set of software modules processes a digital image of the static model to translate its component elements into video game elements in a level file, which may then be played using a game driver.

9 Claims, 25 Drawing Sheets

Related U.S. Application Data filed on Jun. 10, 2013, provisional application No. 61/909,836, filed on Nov. 27, 2013.

(56) References Cited

U.S. PATENT DOCUMENTS

| | | | |
|---|---|---|---|
| 6,738,526 B1 | 5/2004 | Betrisey et al. | |
| 6,785,418 B1 | 8/2004 | Barton et al. | |
| 7,289,130 B1* | 10/2007 | Satoh | A63F 13/10 345/629 |
| 8,160,365 B2 | 4/2012 | Campbell et al. | |
| 8,282,484 B2 | 10/2012 | Toriyama | |
| 8,506,377 B2 | 8/2013 | Heatherly | |
| 8,542,250 B2 | 9/2013 | Baseley et al. | |
| 9,011,246 B1* | 4/2015 | Kier | A63F 13/00 463/31 |
| 9,098,934 B2* | 8/2015 | De | G06T 19/006 |
| 2003/0144048 A1* | 7/2003 | Silva | A63F 3/00157 463/16 |
| 2004/0104935 A1* | 6/2004 | Williamson | G06F 3/012 715/757 |
| 2004/0197750 A1* | 10/2004 | Donaher | G09B 7/00 434/236 |
| 2005/0255078 A1* | 11/2005 | Sakamoto | A61F 13/8405 424/76.1 |
| 2005/0285878 A1* | 12/2005 | Singh | H04M 1/72544 345/633 |
| 2006/0022404 A1* | 2/2006 | Imai | A63F 3/00214 273/236 |
| 2007/0133841 A1* | 6/2007 | Zhang | G06K 9/4604 382/103 |
| 2010/0048290 A1* | 2/2010 | Baseley | A63F 13/10 463/25 |
| 2010/0062846 A1* | 3/2010 | Orlinsky | A63F 3/00643 463/30 |
| 2010/0232690 A1 | 9/2010 | Kanatsu et al. | |
| 2010/0302348 A1* | 12/2010 | Richards | G06F 3/011 348/36 |
| 2011/0090253 A1 | 4/2011 | Good | |
| 2012/0049453 A1* | 3/2012 | Morichau-Beauchant | A63F 3/00214 273/236 |
| 2012/0051601 A1 | 3/2012 | Simske et al. | |
| 2012/0064970 A1* | 3/2012 | Drewry | A63F 13/12 463/30 |
| 2014/0135124 A1* | 5/2014 | Jaqua | A63F 3/00214 463/31 |
| 2015/0174476 A1* | 6/2015 | Morichau-Beauchant | A63F 3/00214 463/43 |

OTHER PUBLICATIONS

Zheng Qin et al., Real-Time Texture-Mapped Vector Glyphs, ACM, 2006, retrieved online on Sep. 30, 2016, pp. 125-132. Retrieved from the Internet: <URL: http://delivery.acm.org/10.1145/1120000/1111433/p125-qin.pdf?>.*

International Search Report, International Patent Application No. PCT/US2014/041146, issued on Oct. 7, 2014, 11 pages.

International Search Report, International Patent Application No. PCT/US2014/041146, mailed Dec. 23, 2015, 8 pages.

* cited by examiner

Tips:
- Use a pencil, you will make mistakes.
- If this is your first time designing a level, start with something simple. If you are having trouble you can download a sample sketch from our website. Don't be afraid to experiment!
- Elevators are created for you at the end of each floor in the blue space, so use all of the grid space for obstacles.
- You'll have options later to define what your pow-erups do - like jump higher, bombs, and speed ups.

HERO'S CAPABILITIES
The following are the standard physical capabilities of your HERO. You'll have a chance later to test your LEVEL, but for now keep these in mind.

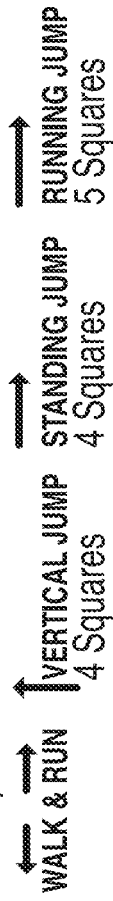

WALK & RUN | VERTICAL JUMP | STANDING JUMP | RUNNING JUMP
4 Squares | 4 Squares | 5 Squares

FIG. 8C

SYSTEMS AND METHODS FOR CREATING A PLAYABLE VIDEO GAME FROM A THREE-DIMENSIONAL MODEL

CROSS-REFERENCE TO RELATED APPLICATIONS

This application claims benefit of U.S. Provisional Patent Application No. 61/909,836, filed Nov. 27, 2013, and is a Continuation-in-Part of U.S. Utility patent application Ser. No. 14/273,267, filed May 8, 2014, which claims benefit of U.S. Provisional Patent Application No. 61/833,336, filed Jun. 10, 2013, and which claims benefit of U.S. Provisional Patent Application No. 61/909,836, filed Nov. 27, 2013. The entire disclosure of all these documents is incorporated herein by reference.

BACKGROUND

1. Field of the Invention

This disclosure is related to the field of interactive video games, specifically to user-based creating or generating of a playable interactive video game.

2. Description of the Related Art

The video game boom of the 1980s spawned a generation of fans who dreamed of designing their own video games. However, early video game platforms, including the Nintendo® Entertainment System, were primarily developed in eight-bit processor assembly languages, which were generally considered difficult to work with, even for experienced programmers. For young fans, learning to develop an actual game was effectively impossible, and aspiring young game designers instead drew their designs on paper, but have never been able to translate those designs directly into a playable video game.

Current game editors do not fill this void. Although some video game products include level editors, they only allow for software-based editing and do not interpret hand-drawn art. For example, in a typical game level editor, a graphical user interface ("GUI") allows the user to select a terrain brush, draw terrain using that brush, and place other game elements onto the terrain, but this is all done on a literal basis. That is, the elements manipulated by the player in the GUI are game literals, having a one-to-one correspondence to the resulting game element in the game level data. However, there is no way for the user to draw the level outside of a level editor.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Because of these and other problems in the art, described herein, among other things, is a computer system for creating a playable video game from a model comprising: an imaging system creating raw image data indicative of an external model of a video game level, the external model having a first pre-defined glyph indicated thereon; a computer-readable medium having computer-readable program instructions embodied thereon, the instructions comprising: a preprocessing module generating preprocessed image data based at least in part on the raw image data; a recognition module iteratively parsing the preprocessed image data and during an iteration identifying in the preprocessed image data one or more data patterns indicative of the first pre-defined glyph and generating glyph data indicative of the first pre-defined glyph and the location of the first pre-defined glyph on the model; a semantic module iteratively parsing the glyph data and during an iteration translating the first pre-defined glyph indicated in the glyph data to a corresponding first video game element according to a pre-defined glyph language and generating semantic data indicative of the corresponding first video game element and the location of the first pre-defined glyph on the model; an accumulator module generating video game level data based at least in part on the semantic data, the video game level data being in a format usable by a video game engine to render a playable video game and the video game level data adapted to cause the video game engine to render the corresponding first video game element at a location in the playable video game corresponding to the location of the first pre-defined glyph on the model.

In an embodiment, the external model comprises a physical object.

In another embodiment, the physical object is two-dimensional artwork.

In another embodiment, the two-dimensional artwork is hand-drawn artwork.

In another embodiment, the hand-drawn artwork is drawn upon video game level design graph paper.

In another embodiment, the external model is a three-dimensional artwork.

In another embodiment, the video game level is a platformer level.

In another embodiment, the image processing system is a digital camera integrated into a computer, the computer including the computer-readable medium.

In another embodiment, the computer is a tablet computer.

In another embodiment: the external model further comprises a second pre-defined glyph adjacent to the first pre-defined glyph; the recognition module further identifies in the preprocessed image data one or more data patterns indicative of the second pre-defined glyph and the generated glyph data is further indicative of the second pre-defined glyph and the location of the second pre-defined glyph on the external model; the semantic module further translates the second pre-defined glyph indicated in the glyph data to a corresponding second video game element according to a pre-defined glyph language and based at least in part on the identity of the corresponding first video game element, and the generated semantic data is further indicative of the corresponding second video game element and the location of the second pre-defined glyph on the external model; the video game level data is further adapted to cause the video game engine to render the corresponding second video game element at a location in the playable video game corresponding to the location of the second pre-defined glyph on the external model.

In another embodiment, the preprocessed image data is generated from the raw image data using at least one image transformation selected from the group consisting of: straightening; aligning; orienting; reducing distortions; reducing image artifacts; sharpening; adjusting color, hue, shadow, tone, lighting, or contrast, cropping, and combinations of one or more of these.

Also described herein, among other things, is a method for playing a video game level comprising: providing a glyph language comprising a plurality of glyphs and, for each one of the glyphs, a corresponding video game element; providing a video game rendering program; receiving digital image data indicative of a external model having a model glyph indicated thereon, the model glyph being selected from the plurality of glyphs in the glyph language; locating in the received digital image data a data pattern indicative of model glyph; determining from the received digital image data the location of the model glyph on the external model; translating the model glyph to the video game element corresponding to the model glyph according to the glyph language; generating video game level data in a format usable by the video game rendering program to render the video game level data as an interactive playable video game, the video game level data comprising the video game element and location data for rendering the video game element, the location data being adapted to cause the video game element to be rendered at a location in the interactive playable video game corresponding to the location of the model glyph on the external model; storing the video game level data in a non-transitory computer-readable memory accessible by the video game rendering program; rendering the video game level data as an interactive playable video game with the video game rendering program; playing the video game level.

In an embodiment, the external model comprises a physical object.

In an embodiment, the physical object is two-dimensional hand-drawn artwork.

In an embodiment, the two-dimensional hand-drawn artwork is a hand-drawn video game level.

In an embodiment, the video game element is an interactive video game element.

In an embodiment, the translating step, the video game element corresponding to the model glyph is determined at least in part based upon context data about the model glyph.

In an embodiment, the context data includes the identity of a second video game element previously translated from a second model glyph located in the digital image data during the locating step.

In an embodiment, the context data includes the location of the second model glyph on the model.

Also described herein, among other things, is a method for creating a playable video game comprising: receiving digital image data; locating in the digital image data a data pattern corresponding to a glyph; translating the glyph to a predefined video game element corresponding to the glyph; generating an executable video game comprising the predefined video game element; storing the executable video game on a non-transitory computer-readable storage medium; creating a video game.

BRIEF DESCRIPTION OF THE DRAWINGS

FIGS. 8A-8D depict an embodiment of drawing rules and/or instructions.

DESCRIPTION OF THE PREFERRED EMBODIMENT(S)

Figure 1:
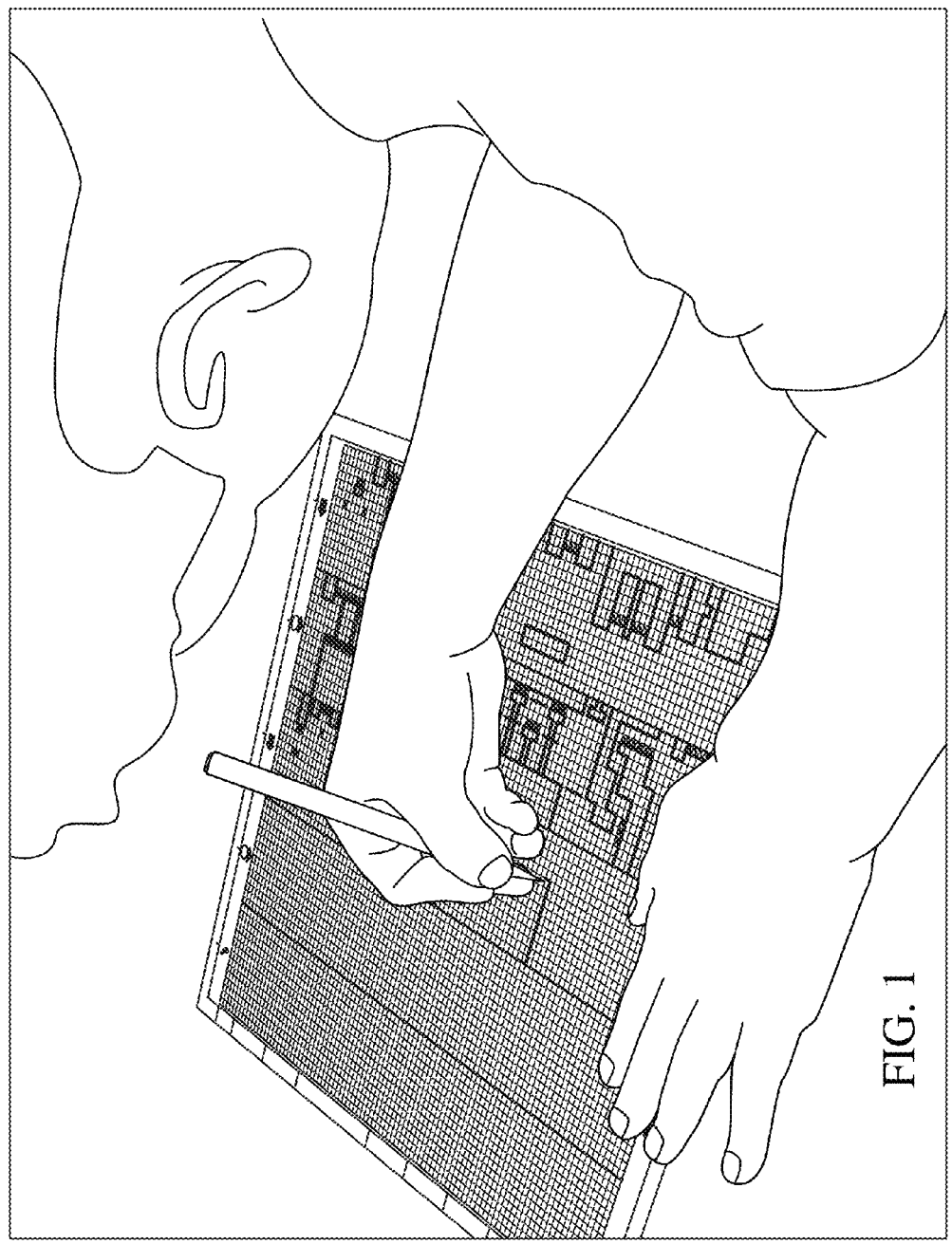
FIG. 1 depicts an embodiment of a user drawing game level artwork.

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and apparatus. As various changes could be made in the above constructions without departing from the scope of the disclosures, it is intended that all matter contained in the above description or shown in the accompanying drawings shall be interpreted as illustrative and not in a limiting sense.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, smart phones, tablet computers, mobile devices, server farms, hardware appliances, minicomputers, mainframe computers, video game consoles, handheld video game products, and wearable computing devices including but not limited to eyewear, wristwear, pendants, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

It is also well known to those of ordinary skill in the art that the functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, algorithms, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

Throughout this disclosure, the term "glyph" means a symbol, letter, number, pictogram, structure, gesture, tone, mark, or element which, in a given use case domain, has or is indicative of or contributive to semantic meaning. While in typography and linguistics, the term "glyph" generally means a written mark, in the present application the term is defined more broadly to include other indicators of meaning, as described herein. For example, a "glyph" as used herein may comprise a three-dimensional symbol or object, including but not necessarily limited to blocks or cubes, tactile languages such as Braille, poker chips, chess pieces, and so on. A glyph may also be four-dimensional, including but not necessarily limited to motion-based glyphs which acquire semantic meaning over time, such as sign languages and gestures. A glyph may also be non-visual in nature, such as auditory glyphs like musical notes, tones, animal noises, or spoken language. A particular glyph may have different semantic meanings in different use case domains.

Throughout this disclosure, the term "use case domain" means a particular field or application which may have or use conventional, standard, predefined or generally known symbols, glyphs, pictograms, gestures, tones, sounds, or structures to indicate elements used or known in the particular field or application. For example, it is common in network design to use a cloud to symbolize a network. Also by way of example and not limitation, it is common in electrical or circuit diagrams to indicate the presence of a resistor using a pictogram comprising a jagged line.

The terms "level" and/or "video game level" are a term of art hailing from the golden age of gaming, when video games generally comprised a sequence of playable levels with defined beginnings and endings. This includes, but is not limited to, games like Pac-Man™, Donkey Kong™, and the well-known Nintendo® Entertainment System product Super Mario Brothers™ which was noted for its level notation (e.g., 1-1, 1-2, 1-3, 1-4, 2-1, etc.). One of ordinary skill in the art will understand that the term "level" has become a term of art referring to a defined playable space within a particular video game, and the particular structure and form of such space necessarily varies from genre to genre. By way of example and not limitation, a "level" in a side scroller-style like Super Mario Brothers™ generally comprises a beginning point and goal and, when the player reaches or achieves the goal, the player has "finished" or "beaten" the level and begins play on an alternative level. For other genres, such as a first person shooter, a "game level" is generally a map defining a limited three-dimensional space in which game play occurs until a condition is met, such as the expiration of time, defeating a certain number of opponents, or locating an "exit." In still other genres, a "level" may lack clearly defined beginning and end points. By way of example and not limitation, in an online role-playing game, players generally move smoothly from one "map" to another without having to achieve any particular condition, and a "game level" in such an embodiment may comprise data indicative of adjacent "game levels" on which the player can play by departing the current game level. In still further embodiments, a "game level" may comprise other data or take other forms particular to the genre. The concept of a "game level" and the meaning of that term will be understood by one of ordinary skill in the art as the term applies to a particular video game genre.

A "video game element" is an element of a playable video game which contributes to the user experience, including but not necessarily limited to: world design, system design, content design, event design, level design, audio design, graphic design, model design, user interface design, narrative design, and multiplayer design. Video game elements may comprise any audiovisual element of the game and generally comprise interactive elements of the game, such as the setting and geography of the game, and the objects or features in the game with which the player can interact.

Certain video game elements are defined functionally with respect to the player avatar in the game. The term "avatar" will be understood by one of ordinary skill in the art to refer to the "character" or other representation of the player which is manipulated by the player while playing the game and is generally the mechanism for player agency within the video game. The functional definition of interactive video game elements will vary from genre and genre and game to game. By way of example and not limitation, side scrollers such as Super Mario Brothers™ typically include interactive game elements which injure, damage, or heal the player upon collision detection, or which provide for "loot" to the player upon collision. These interactive game elements may have further characteristics, such as that they are subject to gravity physics (or not), they are stationary (or not), or they only cause injury, damage, or healing if collision is detected from certain angles (e.g., dorsal collision does not cause damage, but lateral collision does). While interactive video game elements are defined functionally, they are typically represented visually as a game literal. For example, an element causing damage upon collision detection might have a game literal such as fire, spikes, thorns, or an enemy. Interactive game elements have a functional relationship to the player avatar, whereas non-interactive game elements, such as the score counter or game music, generally are experienced or used by the player but not directly used for interaction by the avatar.

A "video game literal" or "game literal" as used herein generally references the aesthetic appearance of a video game element. More than a matter of merely "skinning" a pre-defined game model, selection of a game literal for a game element is effectively arbitrary, as the game literal defines the narrative or associative meaning of the game element, as opposed to the functional meaning. The choice of game literal may generally bear some relationship to the functional game element as a matter of design choice and information efficiency, it need not. For example, for a game element such as damage upon collision detection, the game literal will generally be something that a typical user will associate with causing injury when touched, such as a very sharp object (spikes) or a very hot object (fire). This is so that the game can quickly and efficiently communicate to the player information about how the avatar will interact with the game environment, without the player having to read lengthy instructions or tutorial lessons.

It should be understood that while terms such as "level data" and "video game level" are defined and used herein with respect to video game use case domains, other use case domains are specifically contemplated and alternative formats and engines/drivers/renderers may be used for other use case domains. By way of example and not limitation, in the use case domain of an electrical schematic diagram, the output format may not be video game level data, but rather a CAD file used or usable by a CAD engine, driver, or renderer as an input file. Generally speaking, the accumulator produces data in a format usable by productivity or business software, or used or usable directly by an end-user, for a particular use case domain.

At a high level, the systems and methods described herein comprise an image processing system, a translation system, and a generation system, though additional component systems or subsystems may be included. One or more these components may be implemented as software instructions on a computer system. Generally, a user creates a model having glyphs selected from a pre-defined glyph language, the image capturing system creates a digital image of the model, the translation system converts the glyphs in the digital image into a game element (generally an interactive game element), and the generation system assembles the translated glyphs into a playable video game or video game level. These and other components are discussed in further detail herein.

Figure 2:
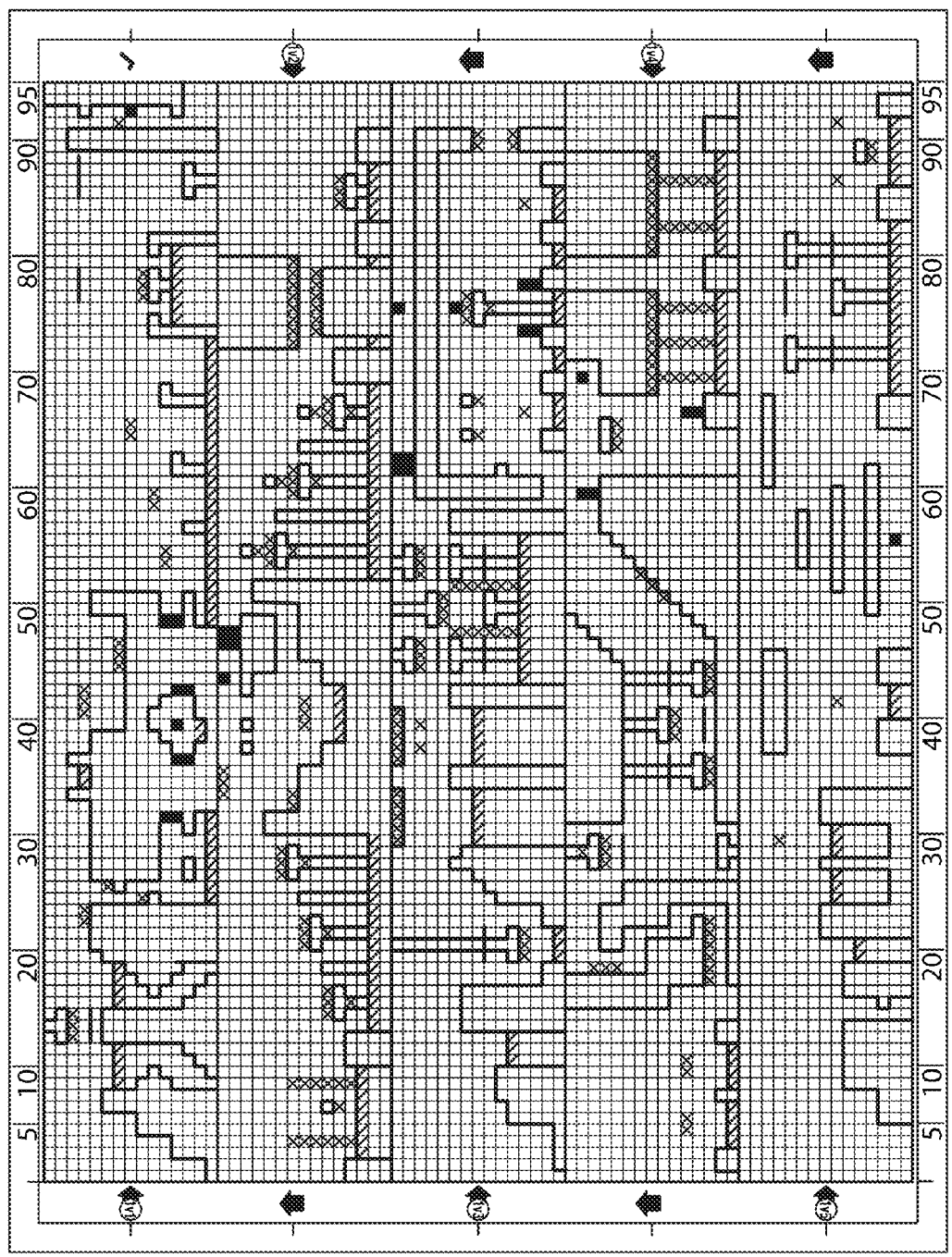
FIG. 2 depicts an embodiment of game level artwork.
Figure 3:
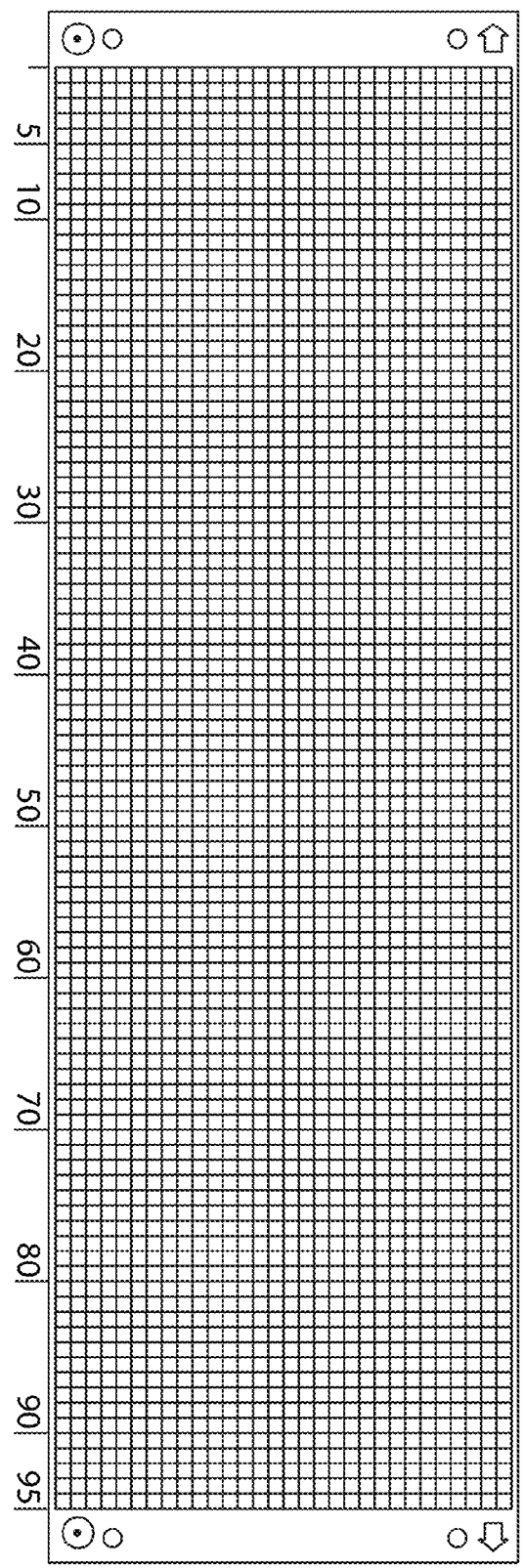
FIGS. 3-7 depict embodiments of blank game level artwork graph paper.
Figure 4:
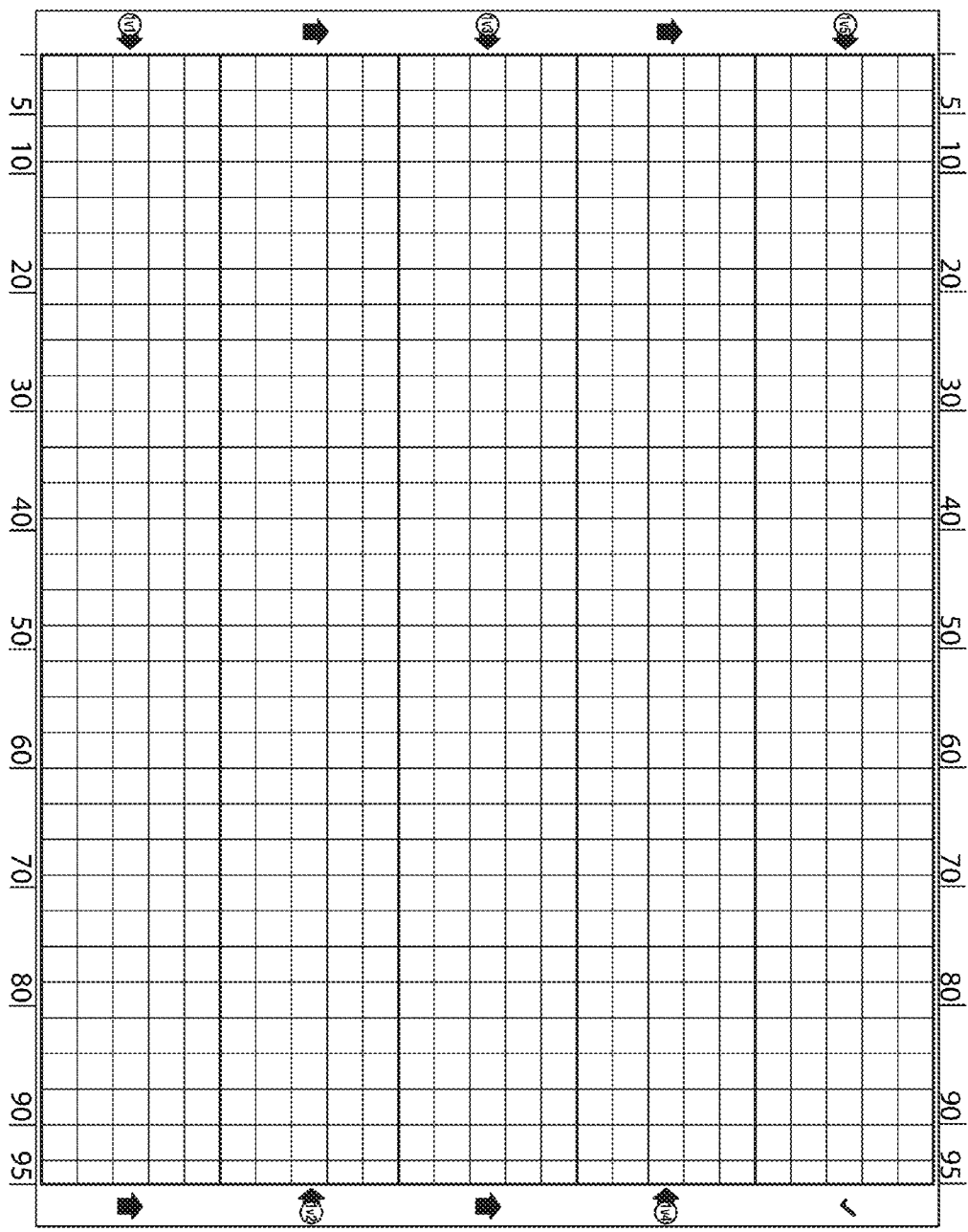
Figure 5:
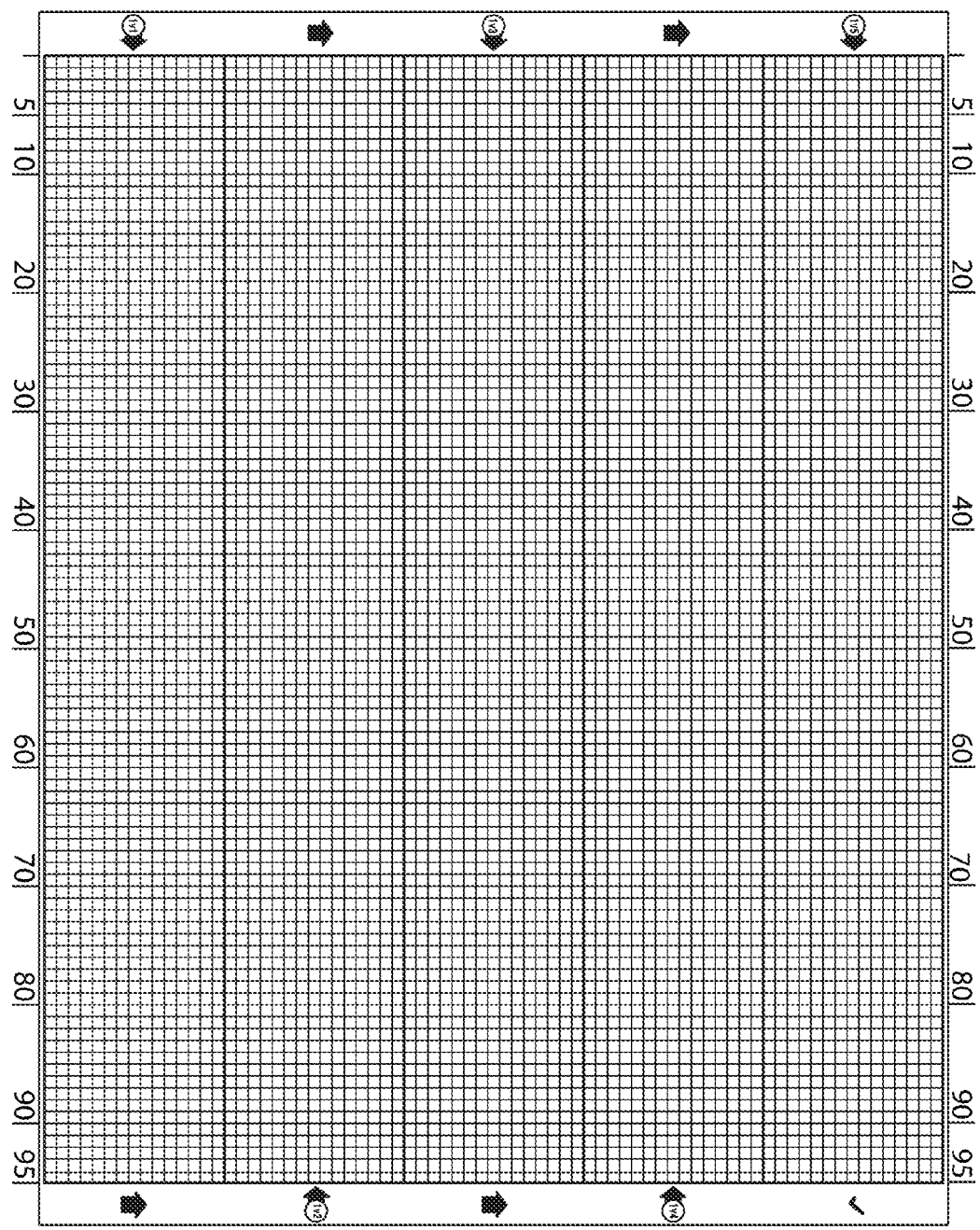
Figure 6:
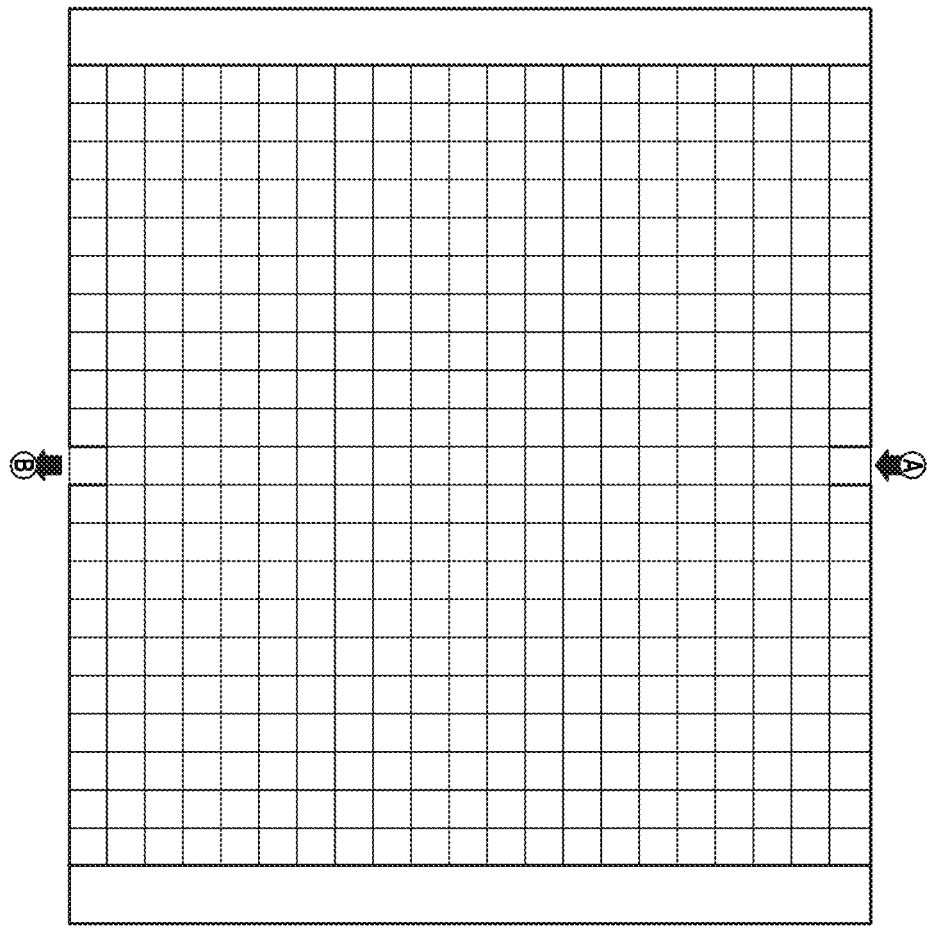
Figure 7:
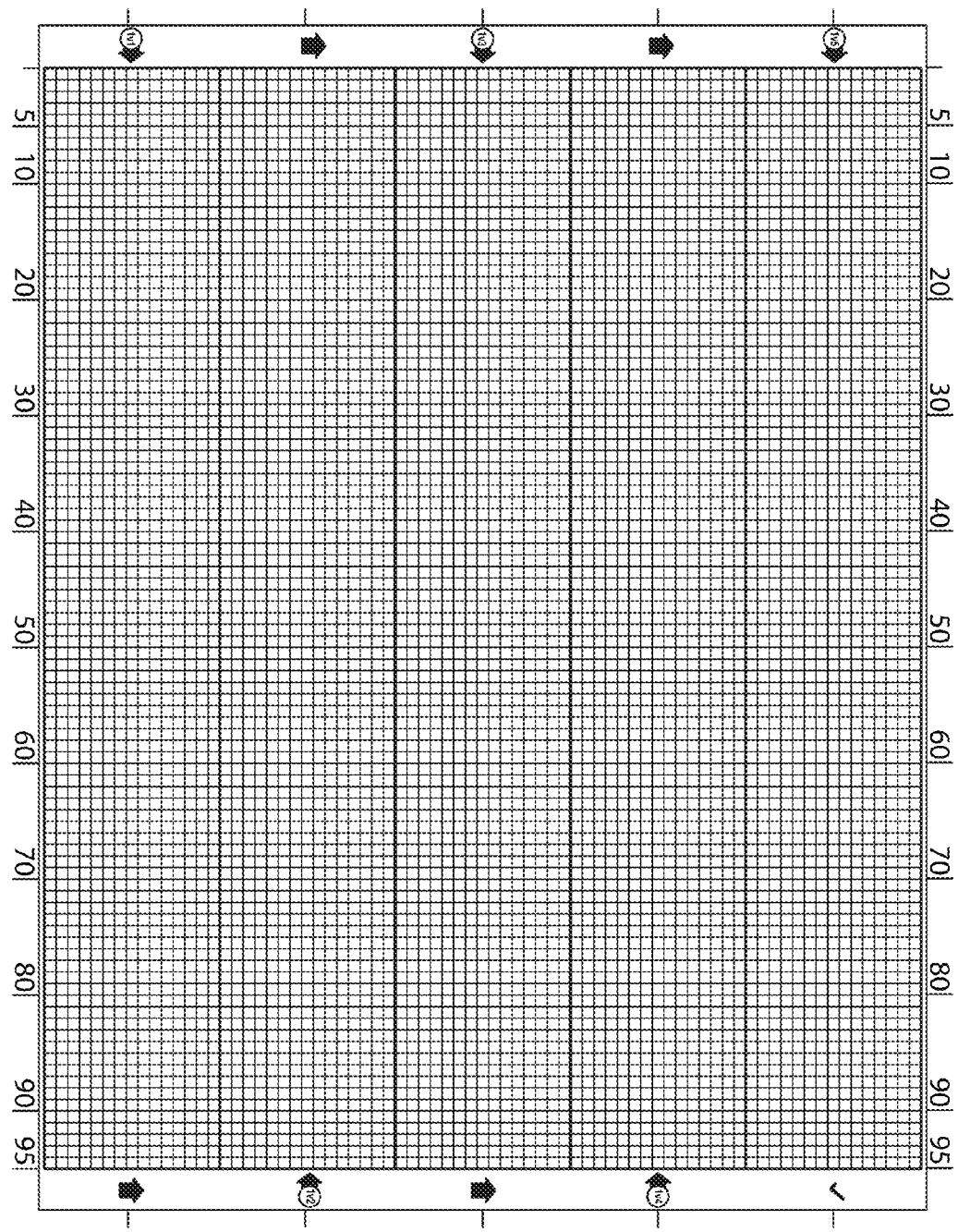
Figure 18:
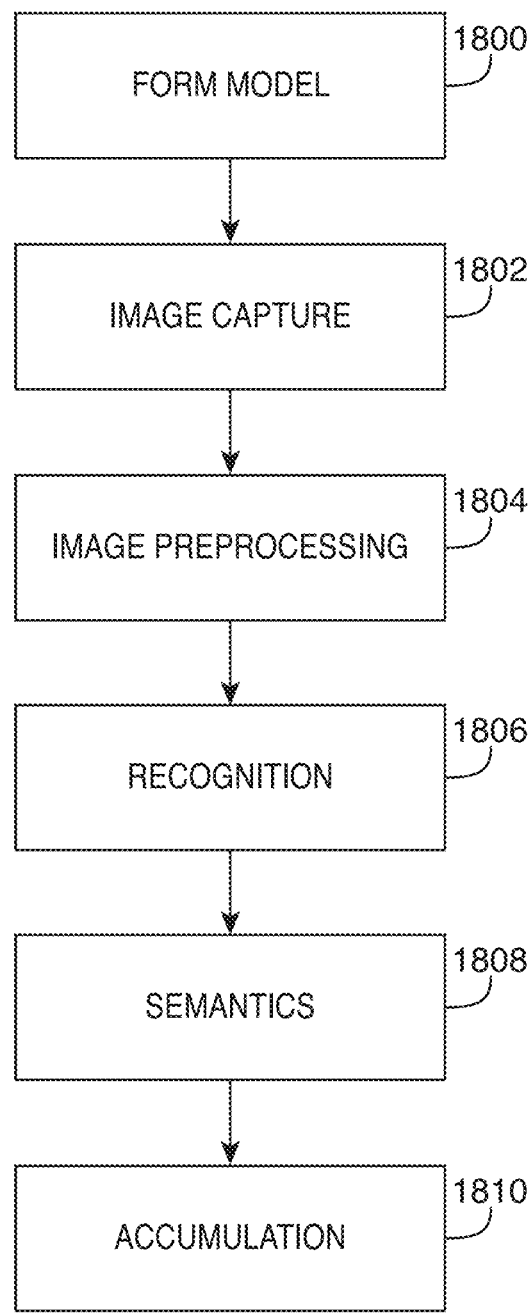
FIG. 18 is a flow chart an embodiment of a method for creating a playable video game from art.

FIG. 18 depicts an embodiment of the systems and methods described herein. In the depicted embodiment, a user forms, creates, or generates a real-world model (1800), such as the model (1917) depicted in FIG. 19. The model (1917) generally includes one or more glyphs (1919). In the typical embodiment, the model (1917) is a two-dimensional hand-drawn video game level, such as that depicted in FIGS. 1 and 2. However, it is specifically contemplated that the model (1917) may be a three-dimensional model, such as a matrix of cubes or blocks. An exemplary embodiment using such a model is described elsewhere herein. Also in the typical embodiment, the model (1917) is drawn on draft/graph paper, such as that depicted in FIGS. 3-7. However, it is specifically contemplated that a three-dimensional model (1917) may be assembled on a board, matrix, or other three-dimensional structure. An exemplary embodiment using such a model is described elsewhere herein. Although drawings are generally contemplated, the model (1917) may comprise any work having one or more glyphs (1919) and which can be imaged. By way of example and not limitation, and as described below, the model (1917) may comprise a three-dimensional structure such as a sculpture or model made from blocks. Alternatively, the model (1917) may comprise a two-dimensional medium used to represent a three-dimensional object, such an isometric drawing and/or a set of orthographic drawings. In a still further embodiment, the model may comprise a four-dimensional object which acquires meaning over time, such as sign language or a gesture. For sake of simplicity and clarity, the term "model" shall be used herein to refer to all user-generated works for use with the systems and methods, regardless of shape, dimension, or medium.

Figure 19:
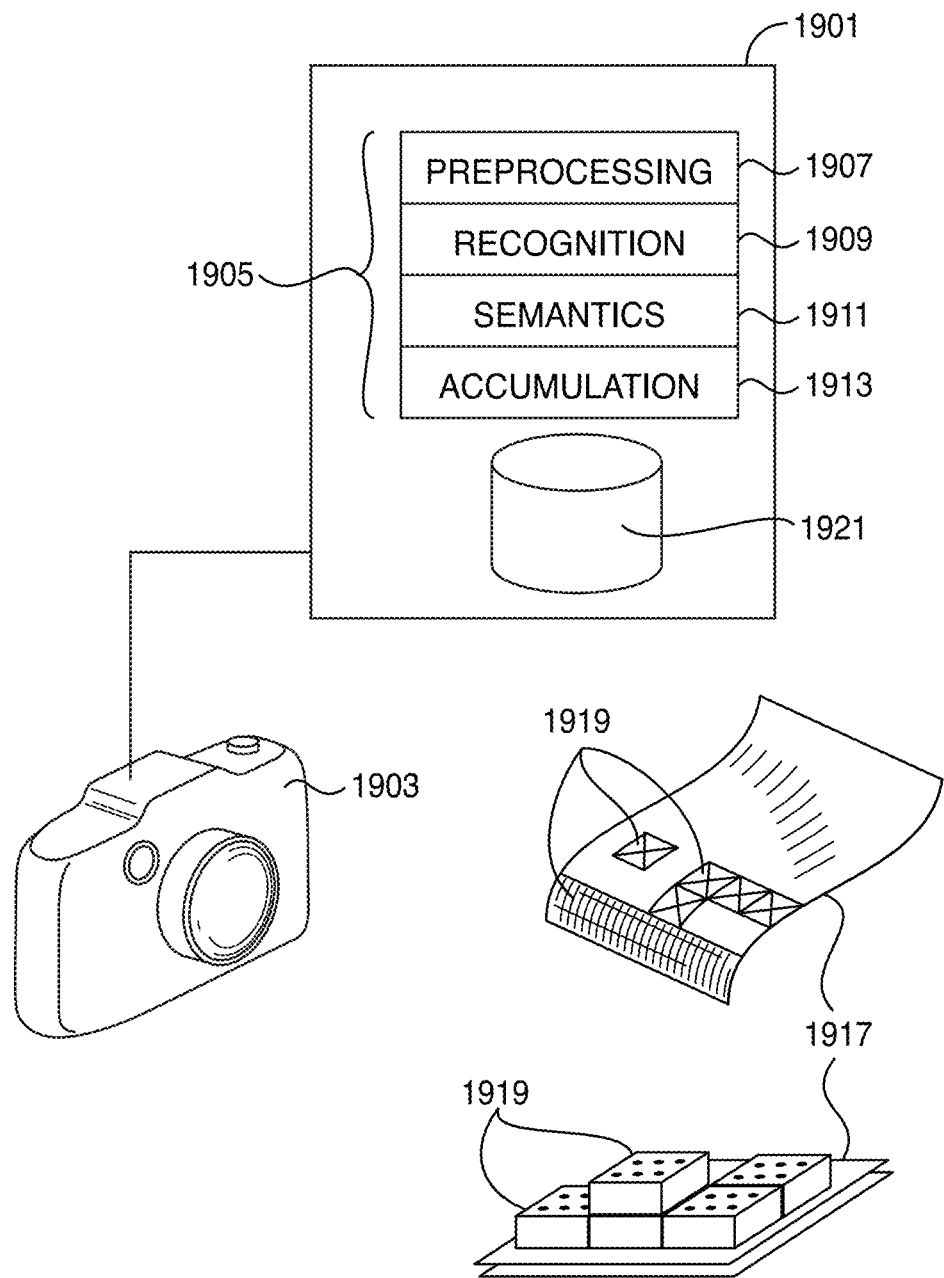
FIG. 19 is a schematic diagram of a system for creating a playable video game from art.

In the embodiment of FIG. 19, the model (1917) is drawn on draft/graph paper, such as that depicted in FIGS. 3-7. Although drawings are generally contemplated, the model (1917) may comprise any work having one or more glyphs (1919) and which can be imaged. By way of example and not limitation, and as described below, the model (1917) may comprise a three-dimensional structure such as a sculpture or model made from blocks. Alternatively, the model (1917) may comprise a two-dimensional medium used to represent a three-dimensional object, such an isometric drawing and/or a set of orthographic drawings. In a still further embodiment, the model may comprise a four-dimensional object which acquires meaning over time, such as sign language or a gesture. For sake of simplicity and clarity, the term "model" shall be used herein to refer to all user-generated works for use with the systems and methods, regardless of shape, dimension, or medium.

Generally, a game level is drawn on graph paper divided into a plurality of grids or sectors, with each glyph being generally drawn on one or more sectors and conforming to the provided grid lines. Exemplary embodiments of such graph paper are depicted in FIGS. 3-7. The use of paper improves the performance and accuracy of other modules described herein by providing identifiably indications of the boundary lines between glyphs. This improves the performance of parsing modules in identify glyphs by allowing the model to be segmented into a plurality of locations on the model (referred to herein as "sectors") which present a smaller amount of data to analyze and process. Other embodiments using alternative media may use similar techniques in different embodiments to provide cues to the processing algorithms of where glyphs may begin and end.

This sectoring technique may be used in an embodiment to establish a one-to-one correlation between a point on the model and a location on the screen. That is, the systems and method may use sectoring to locating on the computing device display on which the game is ultimately played a display location for a sector corresponding to its respective, relative position on the model. This may or may not also be the corresponding position in the video game produced using this method, depending on factors such as the dimensions of the game space.

Figure 21A:
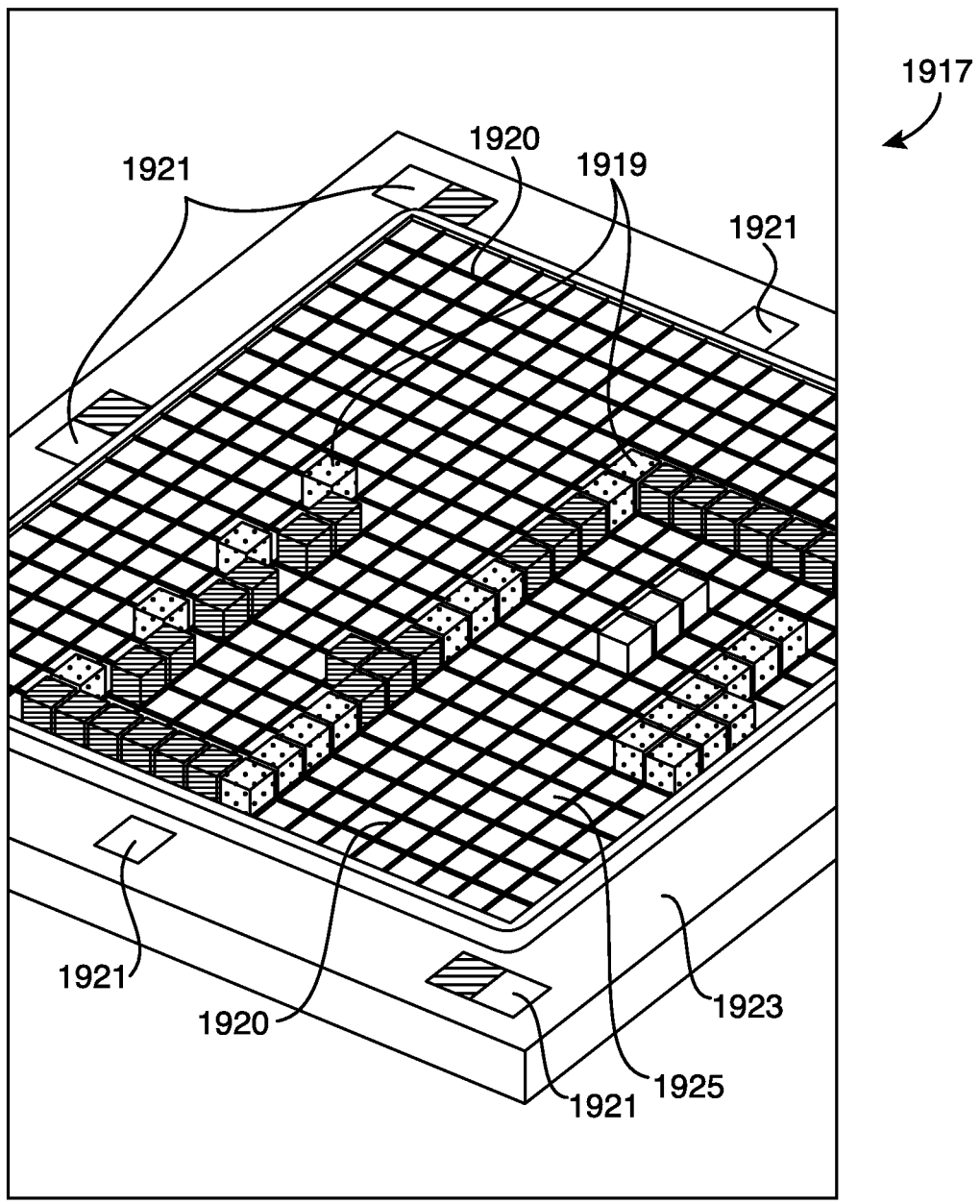
FIGS. 21A and 21B depict embodiments of a three-dimensional model for use with the systems and methods, in which the glyphs are generally cubic blocks.

FIG. 21A depicts an alternative embodiment of the systems and methods wherein the real world model (1917) is a three-dimensional model. In the depicted embodiment, the glyphs (1919A) comprise generally cubic blocks. Each block (1919A) is generally monochromatic, but different blocks (1919A) may be different colors. The blocks/glyphs (1919A) are generally arranged on a game design board (1923) or a template (1923) having a generally orthogonal grid system (1925) for holding blocks (1919A) in place. The depicted grid system (1925) comprises a series of generally square recesses formed by orthogonal raised edges. The depicted grid recesses are slightly larger in size than the typical dimensions of the blocks (1919A). This allows the blocks (1919A) to be easily seated in, and removed from, the grid sectors, but also are a tight enough fit that the blocks will not move substantially once seated. This is important because when the model (1917) is imaged, the blocks are preferably arranged in generally orthogonal fashion to simplify processing and improve glyph recognition accuracy (described elsewhere herein). The orthogonal layout of the depicted embodiment generally corresponds to the "tiled" approach of side-scrollers and runner games; that is, each block/glyph is one game tile in a game level.

Figure 21B:
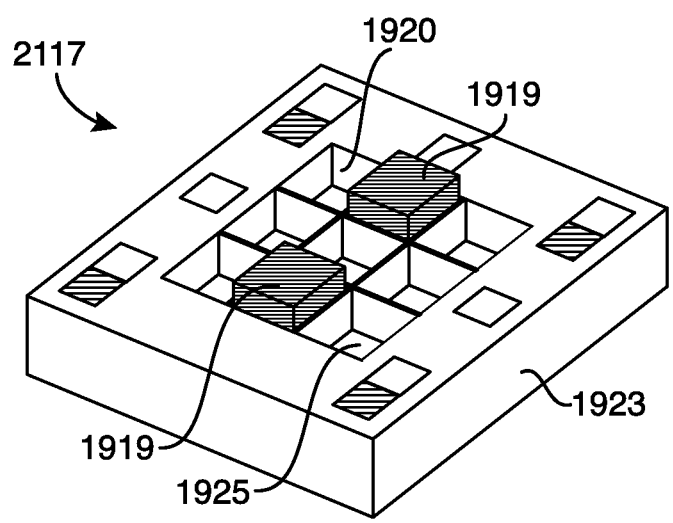

A similar board (1923) or template (1923) is also depicted in FIG. 21B, wherein the grid sectors (1925) comprise a relatively deep recess, such that a majority of the height of the block (1919A) is contained within the grid recess. This has the advantage of further minimalizing movement of the block (1919A) within the grid recess, and reducing the likelihood of a block (1919A) being dislodged if the board (1923) is bumped or upset. While the blocks (1919A) may be generally flush or even recessed within a grid with respect to the top surface of the template (1923), it is generally preferred that at least some amount of the block (1919A) is above the elevation of the grid system (1925) for ease or removing the blocks (1919A). In an alternative embodiment (not depicted), a device may be used to remove the blocks (1919A). By way of example and not limitation, the device may be a wand with a suction cup at one end, or the blocks (1919A) may include magnets and the device comprises a magnetized element which pulls the blocks (1919A) out of the grid system (1925).

It should be further noted that, as with two-dimensional hand-drawn models, the block (1919A) model (1917) may comprise "blank" glyphs (1920). In the three-dimensional block model (1917), the blank glyph (1920) is simply an empty grid sector or recess (1925). The bottom of the grid sector may be specially colored, such as white, to improve accurate recognition of a "blank" glyph (1920), or may alternatively or additionally comprise a special symbol printed or otherwise indicated, such as an "X" or "O" or other easily recognized character or symbol.

Figure 8A:
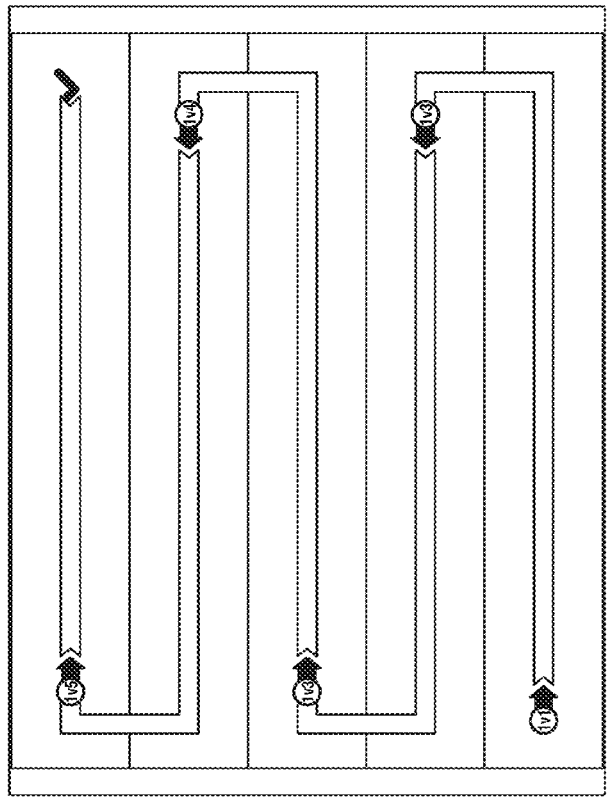
Figure 8B:
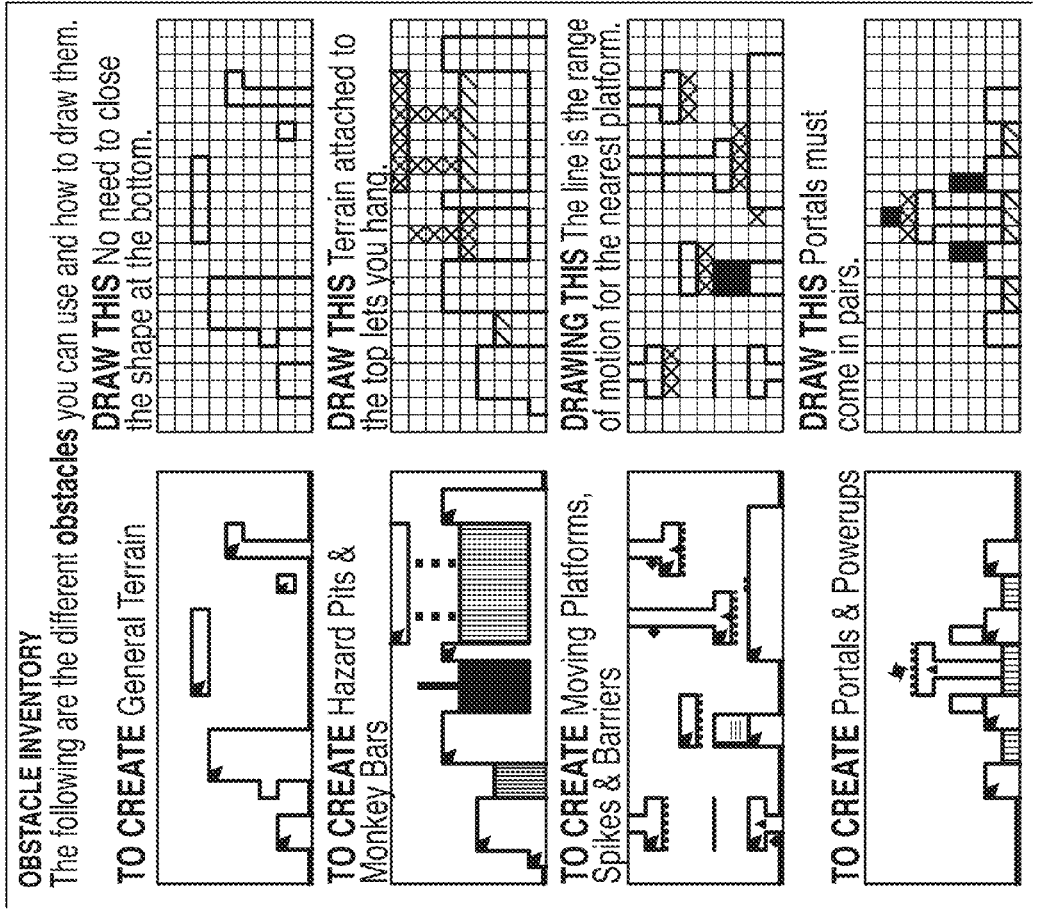
Figure 8D:
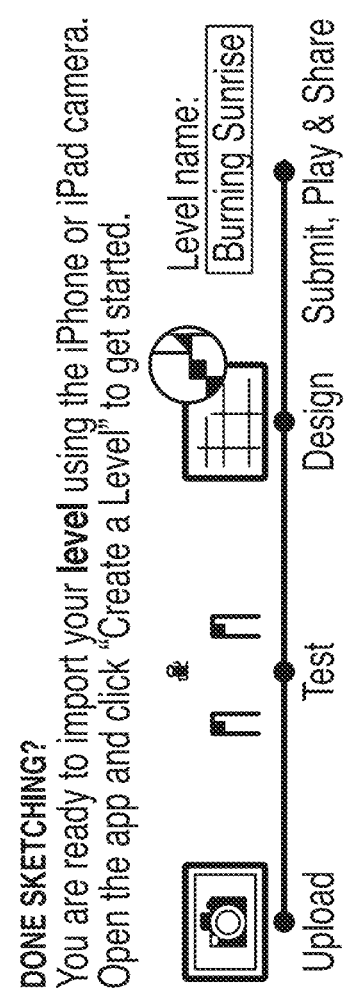

Users generally create the model at least in part according to a glyph language. A glyph language generally comprises a set of glyphs and an associated set of rules or instructions indicating how patterns, symbols, glyphs, marks, shapes, arrangements, elements of a glyph or model correspond to or are associated with game elements in various contexts. Examples include, but are not limited to, terrain, sky, obstacles, levels, heroes, terrain, hazard pits, monkey bars, moving platforms, spikes, barriers, portals, powerups, floors, ceiling, boundaries, and the like. One embodiment of such rules or instructions is depicted in FIG. 8. The elements of a glyph that have meaning in a glyph language will depend on the nature of the glyphs and models.

By way of example and not limitation, in the depicted embodiment of FIG. 21, the blocks (1919A) are all generally the same shape and size and are semantically differentiated in the glyph language by color. In an alternative embodiment, the block shape and/or size may also vary, and/or blocks may have special symbols or additional glyphs on different sides. This allows for further variation with the glyph language by increasing options without requiring additional physical objects. For example, if the use case is an isometric or top-down adventure game or roleplaying game using a map, such as The Legend of Zelda® or the Ultima® series, the color of the block may indicate a terrain type on the game map. A symbol on the block could then indicate particular terrain features. For example, a green block may indicate grassland terrain, whereas a green block with a line from the center of one side to the center of the opposing side indicates a road across grassland terrain in the orientation of the line. A circle with a dot in the middle may indicate a spawn point or trigger, and so forth. Obviously, in particular embodiments, the specific rules will vary according to the preferences and imaginary of the individual designing the glyph language. Without limitation, in a glyph language using blocks, semantic meaning may be derived in whole or in part, alone or combination, from block size, shape, color, texture, orientation, proximity to other blocks or elements, adjacent blocks, and adjacent blanks.

The depicted embodiment of FIG. 18 further comprises capturing an image of the model (1802), generally using an image processing system. In an embodiment, the image processing system is a digital imaging device, such as the device (1903) depicted in FIG. 19. The image processing system generally generates or creates raw image data in a computer-readable format, the data being indicative or representative of the model. The raw image data may be stored in a memory, including a non-transitory computer-readable storage medium. Such data is generally referred to herein as the raw image data.

Figure 9:
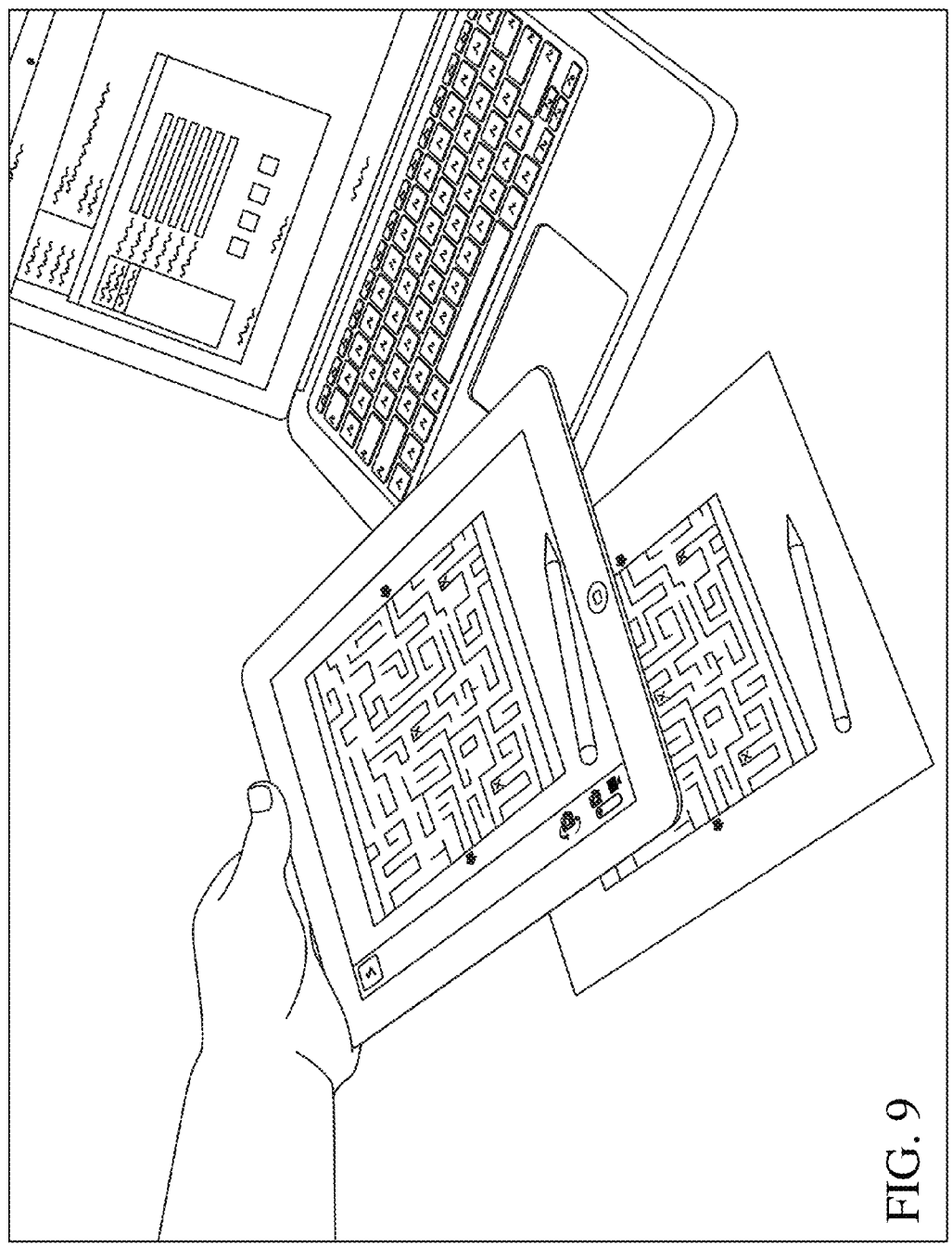
FIG. 9 depicts an embodiment of a user imaging game level artwork using an imaging device.

Typically, the image processing system includes a digital camera, which may also be integrated into or otherwise attached to, attachable to, able to communicate with, or communicating with a computer system, such as a tablet PC or mobile phone. An embodiment of such a system is depicted in FIG. 9. However, in alternative embodiments, the image processing system may comprise a different imaging device. By way of example and not limitation, the image processing system may comprise a three dimensional scanner or a medical imaging device, such as CT, PET, or MRI device. In another alternative embodiment, the image processing system may comprise a motion sensing and/or capturing device, including but not necessarily limited to the Microsoft® Kinect™ sensor. In a still further alternative embodiment, the image processing system may comprise, or be comprised by, a wearable device, including but not necessarily limited to: eyewear, wristwear, neckwear, a device attached or attachable to clothing or accessories, or Google® Glass.

Raw image data is generally provided to computer software which identifies in the image the data glyphs in the real-world model and translates the identified glyphs into game elements. The raw image data (1804) may first be prepared for this processing, such as by the preprocessing module (1907) depicted in FIG. 19. The depicted preprocessing module performs various alterations, modifications, and transformations to raw image data to standardize, normalize, and/or otherwise prepare the image data for processing by downstream modules. These transformations include, but are not necessarily limited to: straightening; aligning; orienting; reducing distortions, lens flares, and/or other image artifacts; sharpening; altering image characteristics including but not limited to color, hue, shadow, tone, lighting, and/or contrast; cropping; finding, identifying, and/or using boundary markers or position indicators. These preprocessing steps may improve overall glyph recognition performance and reduce development time by providing image data in a standard format. For example, a recognition module (described elsewhere herein) may achieve better performance if the raw image data has a particular orientation.

The preprocessor (1907) generally generates altered image data, generally referred to herein as preprocessed image data. This data may replace or overwrite raw image data, or may be stored separately from raw image data. Preprocessed image data may be stored in a memory or non-transitory computer-readable storage and may be transmitted or provided to, or received from, a module or computer. In an embodiment, a plurality of preprocessed image data sets may be generated for a single model.

In an embodiment, geometric criteria are used to identify boundary markers (e.g., markers 2121 as depicted in FIGS. 21A and 21B) and determine whether the imaging system is properly centered on the model or artwork. This may be done by identifying one or more candidate boundary markers (1921) and evaluating each such candidate boundary marker (1921), particularly with respect to the geometric relationship between or among a plurality of such candidate boundary markers (1921). A plurality of combinations of boundary markers (1921) may be considered, sorted, or otherwise analyzed to identify a best match for an anticipated or predefined geometric arrangement of boundary markers (1921). By way of example and not limitation, the criteria may include whether a plurality of candidate boundary markers (1921) are generally collinear, or whether a particular set of generally collinear boundary markers are generally perpendicular to another set of generally collinear boundary markers (1921). A still further criteria may be whether a plurality of boundary markers (1921) are generally equidistant from one another or from a reference boundary marker (1921).

Preprocessed image data is generally processed by a recognizer module (1806), such as the recognizer module (1909) depicted in FIG. 19. The recognizer module (1909) generally parses or processes the preprocessed image to identify, locate, or recognize symbols, glyphs, marks, shapes, or other elements of the model corresponding to a game element. This may be done by finding data patterns in the preprocessing image data corresponding to a particular glyph (1919), suggesting that the corresponding glyph (1919) appears on the original model (1917). These data patterns may be predefined, preprogrammed, hard-coded, or otherwise supplied to the recognizer module (1909). The data patterns generally comprise indications of a glyph (1919) and/or other elements or symbols in the model (1917). In a typical embodiment, the system is trained to recognize glyphs in advance of release as a consumer-grade product. Although the systems and methods may be implemented through optical character recognition, training the system on data patterns reduces processing demand at runtime. In effect, the recognizer module (1909) need only recognize data patterns, without regard to the appearance of the associated glyph.

The recognizer (1909) generally generates or creates a dataset comprising data indicative of one or more glyphs (1919), or other elements of the model (1917), recognized in the preprocessed image data. This dataset is generally referred to herein as glyph data. Glyph data may be stored in a memory or non-transitory computer-readable storage and/or may be transmitted to or received from a module or computer. In an embodiment, this dataset may further comprise other data indicative of characteristics of an identified glyph (1919), including but not necessarily limited to: the color of the glyph (1919); the identification of glyphs (1919) adjacent to the glyph (1919); the position or location of the glyph (1919) in the model (1917).

In an embodiment, the recognizer (190) a segmenting process to process preprocessed image data on a sector-by-sector basis. For example, where the model is hand-draw artwork on graph paper having grid lines, the grid lines may be used to segment the model into a plurality of grid locations, or "sectors," with each grid location potentially having a glyph drawn thereon. Alternatively, where the model is a three-dimensional model using blocks in a grid system (1925), the raised grid edges defining the boundaries of the grid recesses into which blocks are placed map to a sector. Using the preprocessing features described herein, the graph paper (or board (1923) may be oriented properly for such grid lines (or edges/recesses (1925)) to be algorithmically detected by software, increasing the speed and accuracy of other modules, such as the recognition module, in finding and identifying glyphs.

In an embodiment, the recognizer (1909) is implemented iteratively, such as through sequential execution of a plurality of support vector machine classifiers for each glyph in the glyph language. Each such classifier may determine whether the preprocessed image data, or a portion thereof (such as a sector), matches a particular glyph or not. If a particular glyph is recognized, the classification process terminates as to that glyph, and/or that portion of the preprocessed image data. If the glyph is not recognized, the next classifier in the plurality of classifiers may be executed to search for another particular glyph. A classifier may determine whether preprocessed image data matches a particular glyph by, for example, analyzing whether preprocessed image data includes a data pattern identical, similar, indicative of, or related to data patterns associated with the particular glyph the classifier is programmed to recognize. The recognizer may also store in the glyph data the corresponding sector in which an identified glyph is located.

In an embodiment, glyph data is processed by a semantic module, such as the semantic module (1911) depicted in FIG. 19. The semantic module (1911) generally determines the correct game element to translate each glyph into, and generates semantic data containing this game element. Generally, the glyph is translated into a functional meaning—that is, to an interactive game element, and not necessarily a game literal. The translation is generally based upon the glyph language, the glyph context, and a use case domain. It is important to understand certain distinctions between the semantic module (1911) and the recognizer module (1909). Whereas the recognizer (1909) identifies which glyphs are in the model and where they are found, the semantic module (1911) interprets what the glyphs mean in context. For example, a "blank" glyph (1920)—that is, a sector with no user-indicated markings or symbols—may mean "sky" in one context and may mean "ground" in another, as provided by the glyph language. The context of a glyph generally comprises the glyphs directly adjacent to it, but may also include, without limitation: the color of the glyph (1919); the identification of glyphs (1919) adjacent to the glyph; the position or location of the glyph (1919) on the model (1917); glyph or context borders, glyphs indirectly adjacent to the glyph; and/or other context or glyph (1919) characteristics.

The semantic module (1911) generally generates or creates semantic data based at least in part on glyph data. Such semantic data generally comprises data indicative of one or more game elements, such elements generally being interactive game elements having functional meaning, translated from glyph data. The game elements are generally associated with a glyph (1919) in the glyph language.

In an embodiment, the semantic module performs multiple passes through the glyph data. This is because some glyphs require little or no context to be translated to a game element, but the corresponding functional meaning of other glyphs may not be determined without additional context, such as by translating adjacent glyphs. In a pass through the data, additional glyphs are translated, or attempted to be translated, to game elements. As successive passes through the glyph data provide incrementally more context, more and more glyphs can be translated to game elements, until all glyphs have been fully translated. The process of translating a glyph is referred to herein as "resolving" the glyph. Some glyphs may be only partially resolved during a pass, and then fully resolved in a subsequent pass.

This may be better understood with reference to an illustrative example. Suppose the glyph language defines a rectangle glyph (or, for a block-based model as in FIGS. 21A and 21B, one or more adjacent brown blocks) as having the functional meaning of a static traversable. This function may correspond to an effectively limitless number of game literals, including but not limited to: ground, a roof, a floor, a platform, a tree branch, a ship deck, a table top, or a force field. However, if the rectangle glyph is adjacent to an arrow glyph (or, for a block-based model as in FIGS. 21A and 21B, the final brown block on one end has an arrow on it), the glyph language provides that the functional meaning changes from static traversable to a movable traversable. Thus, although the rectangle glyph can be identified without identifying or resolving the adjacent arrow glyph (a recognizer function), the functional meaning of the rectangle glyph is not fully resolved until the adjacent arrow glyph is resolved (a semantic function).

Likewise, the functional meaning of the arrow glyph cannot be fully determined until the rectangle glyph is at least partially resolved. Thus, multiple passes are needed—first to partially resolve the rectangle glyph into a static traversable, second to resolve the arrow glyph, and third to fully resolve the rectangle glyph. It should be noted that, in an embodiment, certain glyph resolutions can be combined in a single pass. This may be done for, among other things, processing or development efficiency. In this illustrative example, resolving the arrow glyph and resolving the movable traversable could be handled in a single pass. The particular composition of each pass will necessarily vary with the particular glyph language, and with the programming techniques used to identify glyphs. For a given glyph language, many different algorithmic approaches are possible to resolve all glyphs. This is but one illustrative example and should not be understood as limiting.

In an embodiment, the semantic module may create and/or maintain a data structure for tracking and updating glyph resolution. This is generally stored and maintained in a computer-readable medium operatively coupled to a processor and other typical computer hardware. By way of example and not limitation, this data structure may comprise a context table or context graph having context data. A context graph may comprise a one or more datasets corresponding to a sector and each such dataset may be used to track and update context data and/or glyph resolution data for the corresponding sector. This approach is particularly useful for glyphs which resolve to functions that have few or no data analogs in the resulting video game level data (discussed elsewhere herein), such as empty or open space, as it can reduce the memory footprint and increase processing efficiency. By way of example and not limitation, a semantic module pass may indicate that a given blank glyph has a "sky" function (passable/no collision detection) and update the context graph data corresponding to that given sector to have a "sky" context.

Figure 20:
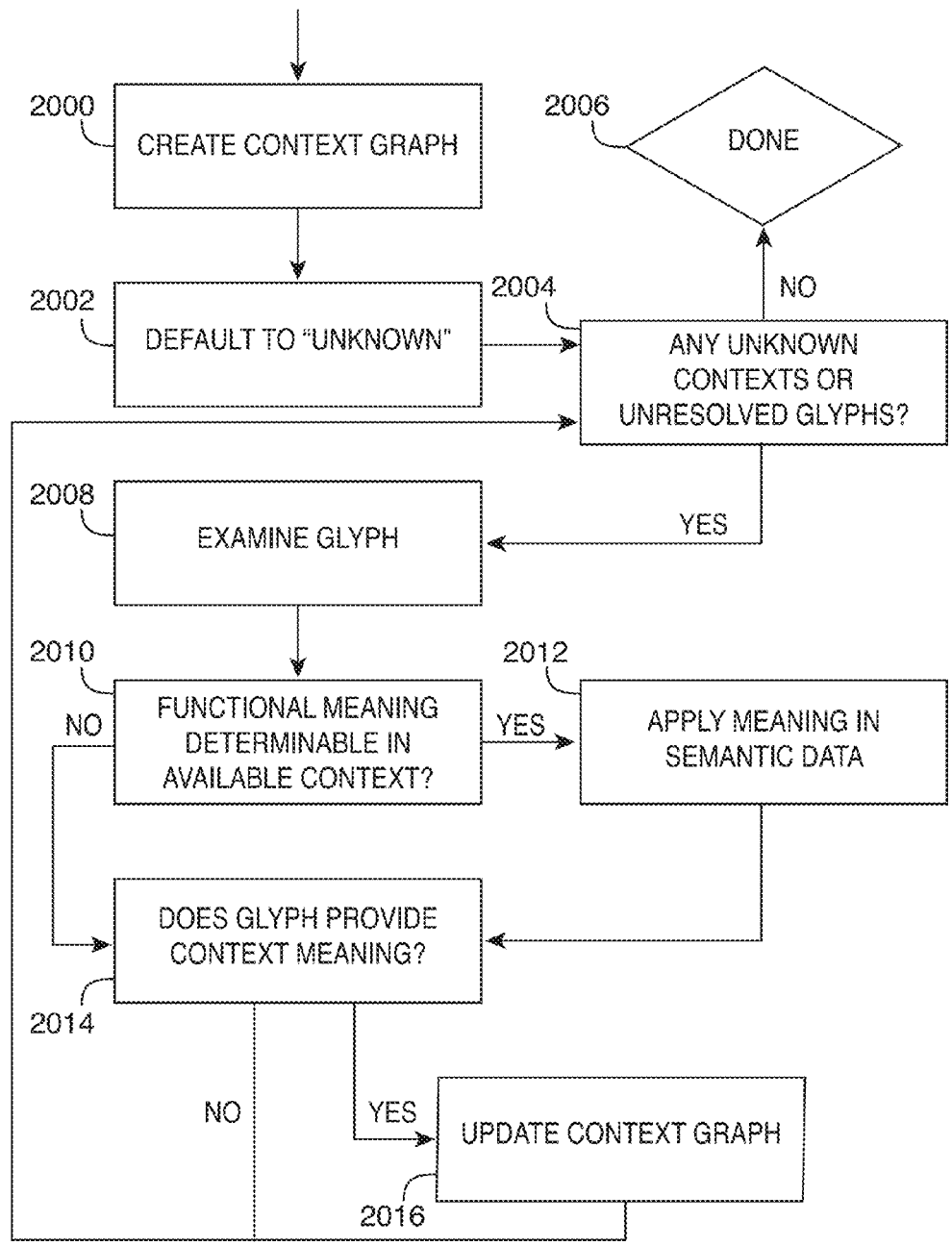
FIG. 20 depicts an embodiment of an iterative semantic context parser.

This also may be better understood with reference to an illustrative example. In an embodiment, the glyph language defines the "blank" glyph as having a different meaning in different contexts. For example, a blank glyph may have a "sky" function (passable/no collision detection) in one context and a "ground" function (impassable/collision detection) in another (e.g., the blank glyph is enclosed in a polygon glyph defining a static traversable). To determine whether a given blank glyph is "sky" or "ground," the semantic module may complete one or more passes through the glyph data to develop sufficient context data to determine which functional meaning to apply to each blank glyph. An example of this technique is depicted in the flow chart of FIG. 20.

In the depicted flow chart, a context graph is created (2000) in memory comprising data corresponding to sectors. The context for each sector is initially defaulted to an "unknown" value (2002), such as a program constant. In the depicted embodiment, the system determines whether any sectors remain unknown (2004) at the beginning of each iteration, though this step may be carried out during or after each iteration in an alternative embodiment. The choice of when to perform this check is an implementation detail generally left to a programmer's design discretion. If no sectors remain unknown, the context parsing may terminate (2006). However, if sectors remain unknown, additional iterations may proceed to examine additional unknown contexts or glyphs and resolve them (2008).

Continuing the illustrative example, during early passes, glyphs whose functional meaning is not highly context-dependent may be resolved and functional meanings assigned. Similarly, glyphs which provide context meaning (whether or not they can be resolved during the pass) may be used to determine context meaning for themselves and/or for adjacent glyphs or sectors. By way of example and not limitation, if a "+" glyph (or, e.g., a yellow block in FIGS. 21A and 21B) means a static game object removed upon collision (e.g., a coin, a power-up a balloon, ammunition), the functional rules for such an object imply that it belongs in a "sky" context (i.e., passable/no collision detection). This is because the functional meaning of the glyph is defined by contact with the avatar, and this function would be unusable in a "ground" context (impassable/collision detection) because the avatar could not reach it.

Continuing the illustrative example, when the "+" glyph (or yellow block) is found in the glyph data, its corresponding function can be determined (2010) and its associated functional meaning can be applied (2012), such as by referring to the glyph language and/or use case domain. The resulting game element is then added to the semantic data (2012). Likewise, this glyph provides context (2014) to adjacent "blank" glyphs (e.g., also "sky" context) and the context graph for such adjacent glyphs can be updated (2016) to reflect the context discovered during this pass. This in turn allows additional blank glyphs, adjacent to the blank glyphs adjacent to the "+"/yellow glyph, to be assigned functional meaning—again, "sky." A flood-fill algorithm may be used to repeat this process and locate all such "blank" glyph locations in the context graph and indicate "sky" context for such glyphs in the context graph. In an embodiment, the "flood fill" algorithm may be performed in the same pass as the identification of the "+"/yellow glyph, or in one or more subsequent passes.

Continuing the illustrative example, some glyphs may have context-sensitive functional meanings, meaning at least some context is resolved before the glyph is resolved. By way of example and not limitation, an "X" glyph (or red block) may have the functional meaning in the glyph language of avatar damage upon collision detection in one context (e.g., a game literal of lava, spikes, or fire) but of suspended avatar physics in another (e.g., monkey bars). Thus, when an "X"/red glyph is found, adjacent glyphs are evaluated to determine context and identify the corresponding functional meaning for a particular "X"/red glyph. If the adjacent glyphs have not yet been resolved, the functional meaning for "X"/red may not yet be determinable (2010), and the glyph is not yet assigned functional meaning. However, the glyph may still provide context information (2014) whether or not its functional meaning is determinable during the pass.

Continuing the illustrative example, contexts may also be resolved by algorithmically locating the borders of a given context and assigning glyphs on the opposing side of the border with an opposing context. By way of example and not limitation, if a blank glyph is known to have a "sky" context and the borders of the "sky" context are defined as a closed polygon, the blank glyphs within the enclosed polygon on the opposing side of the border of the "sky" context are necessarily "ground" context and can be translated (2016) as such, and the context graph updated accordingly.

Continuing the illustrative example, still other glyphs may require a completed or nearly-completed context graph to be resolved. By way of example and not limitation, an arrow glyph such as ">" might apply motion physics to adjacent impassable/collision detection game elements to form a moving platform. This may, in an embodiment, require otherwise complete context data. As such, glyphs corresponding to directional movement and/or distance may be resolved in the latter passes after most, or all, of the context graph is complete and few or no "unknown" locations remain. By way of example and not limitation, where the object is a moving land mass such as a platform, the moving platform may be identified algorithmically and direction and distance determined from the motion physics glyph (or glyphs) applicable to that platform as provided in the glyph language and/or use case domain. Again, a context graph (2016) and/or semantic data (2012) may be updated with the resulting context data and/or game element data.

In an embodiment, semantic data is processed by an accumulator module, such as the accumulator module (1913) depicted in FIG. 19. The accumulator module (1913) generally comprises programming which processes semantic data to produce video game level data based at least in part upon semantic data. Generally, the accumulator (1913) produces video game level data based upon the functional meaning applied to one or more glyphs (1919) and/or characteristics thereof identified in the preprocessed image data. In an embodiment, video game level data is generated in a format used or usable by a driver, engine, or renderer as a playable video game level. In an embodiment, the engine, driver, or renderer using said video game level data is Unity™. In an alternative embodiment, the engine or driver may be other programs such as, but not limited to, is GameMaker™ or Game Salad™. In an embodiment, video game level data is stored on computer-readable non-transitory media as a logical or physical file or stored in memory and may be transmitted to or received from a module or computer.

For any given use case domain, the recognizer and/or semantic modules may be preprogrammed or otherwise supplied with the glyph language. The language may be generally known or associated in the use case domain with certain meanings, or may be developed for a particular or specific use case domain. By way of example and not limitation, a use-case domain may be or comprise: video games; a platform video game; a racing video game; an isometric adventure video game; storyboarding; music and/or music notation; network design; electrical design; Braille; web design; architecture; software design; modeling; model trains and/or logistics; electric or circuit design; medical and/or biological; presentations; welding; HVAC; 3D printing; sports and play design; automotive; 3D models of blocks, including but not limited to an orthogonal layout of blocks such as that depicted in FIGS. 21A and 21B, or interlocking blocks such as Legos™ or Duplos™; object recognition; mapping; geocaching; construction; drafting; interior design; exterior design; landscape design; gardening; occupational therapy; physical therapy; educational therapy; learning tools; fashion design; manufacturing; product design; industrial engineering; board game design; table top gaming design; card game design; jewelry design; surveying; stratification; cores; live tracing; data entry; quality grading, including but not limited to collectibles, baseball cards, comic books, and antiques; scrapbooking; mathematics; physical training; notes and calendars; OCR knowledge search; origami and/or balloon animals; medical imaging; and/or other such domains.

In an alternative embodiment, specific use case domains may be defined or provided which define a glyph language for that domain and the associated functional meaning of such glyphs in such language. As such, the meaning of a glyph may vary between use case domains, and even between related or similar use case domains. By way of example and not limitation, a use case domain may be a video game genre, such as a platformer in which the glyph "X" has the semantic meaning of a surface capable of supporting a sprite, such as but not limited to an avatar. However, in an alternative use case domain, such as an isometric realtime roleplaying game, the glyph "X" may have the semantic meaning of impassable terrain. In a still further use case domain, such as landscape design, the glyph "X" may indicate an existing structure to be demolished and removed.

Figure 10:
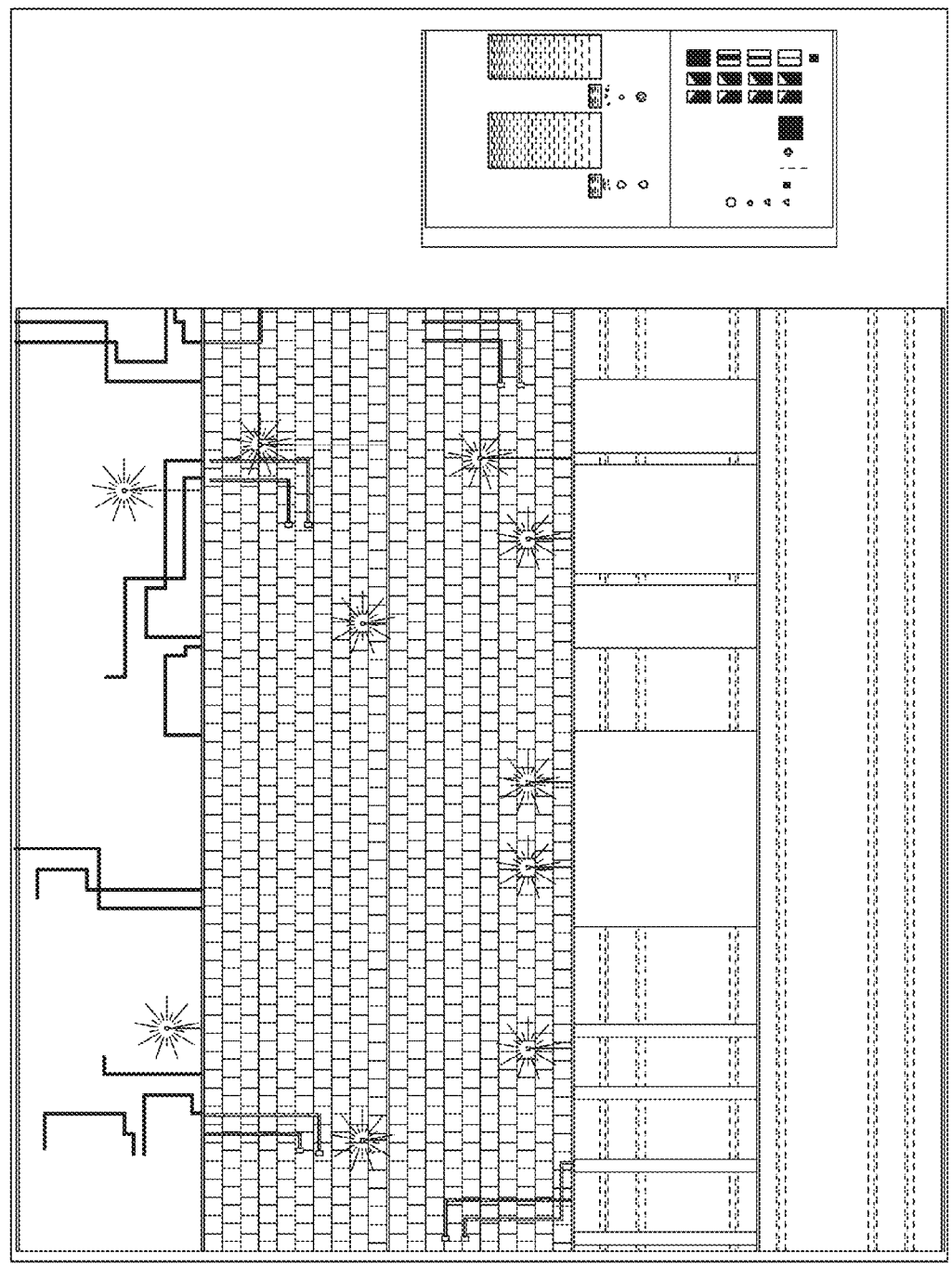
FIG. 10 depicts an embodiment of a sprite sheet.
Figure 11:
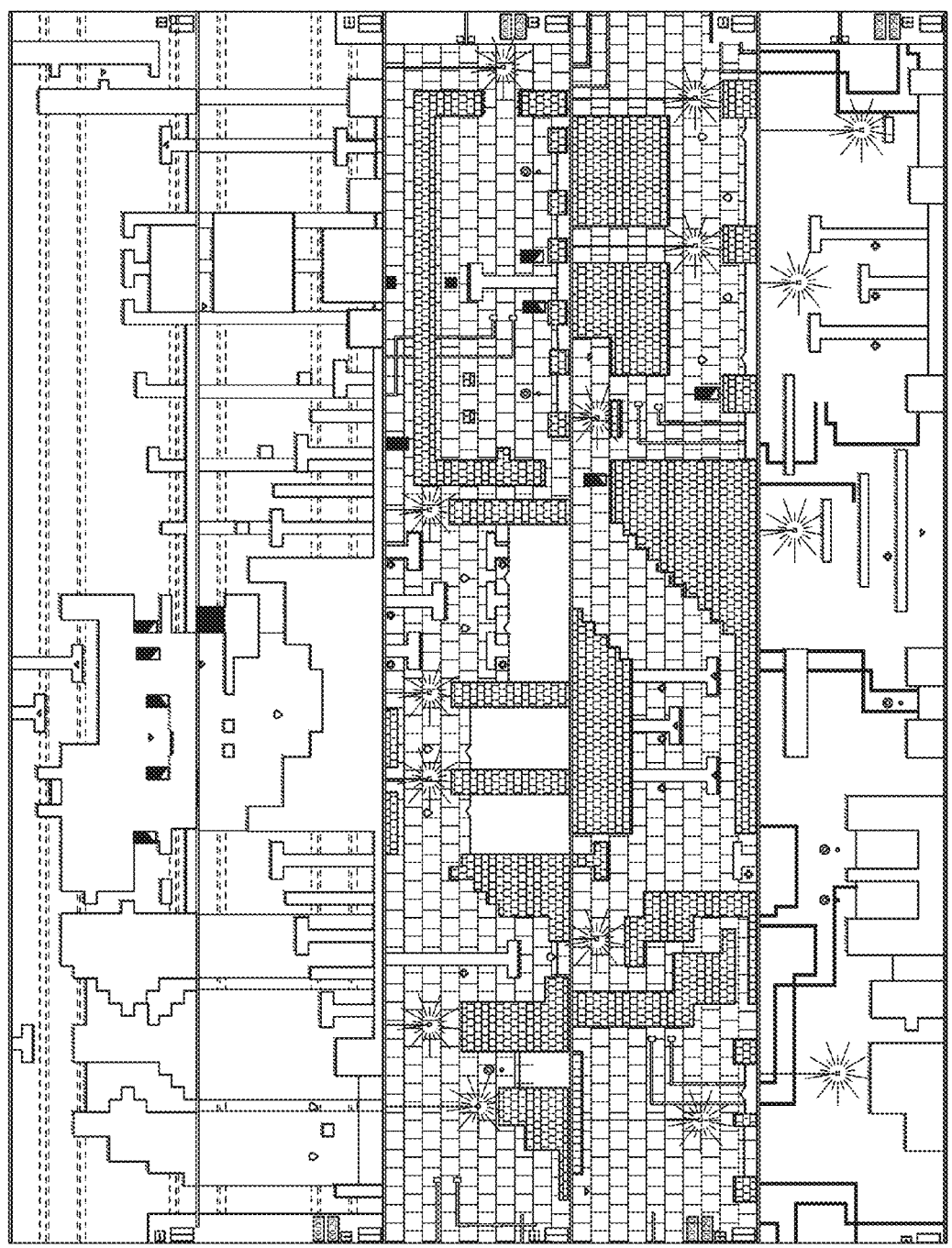
FIG. 11 depicts an embodiment of a game level generated from game level artwork and a sprite sheet.

In an embodiment, the video game level data may also be generated at least in part using a sprite sheet, an example of which is depicted in FIG. 10 this disclosure. An embodiment of a level generated from artwork and a sprite sheet is depicted in FIG. 11.

Figure 12:
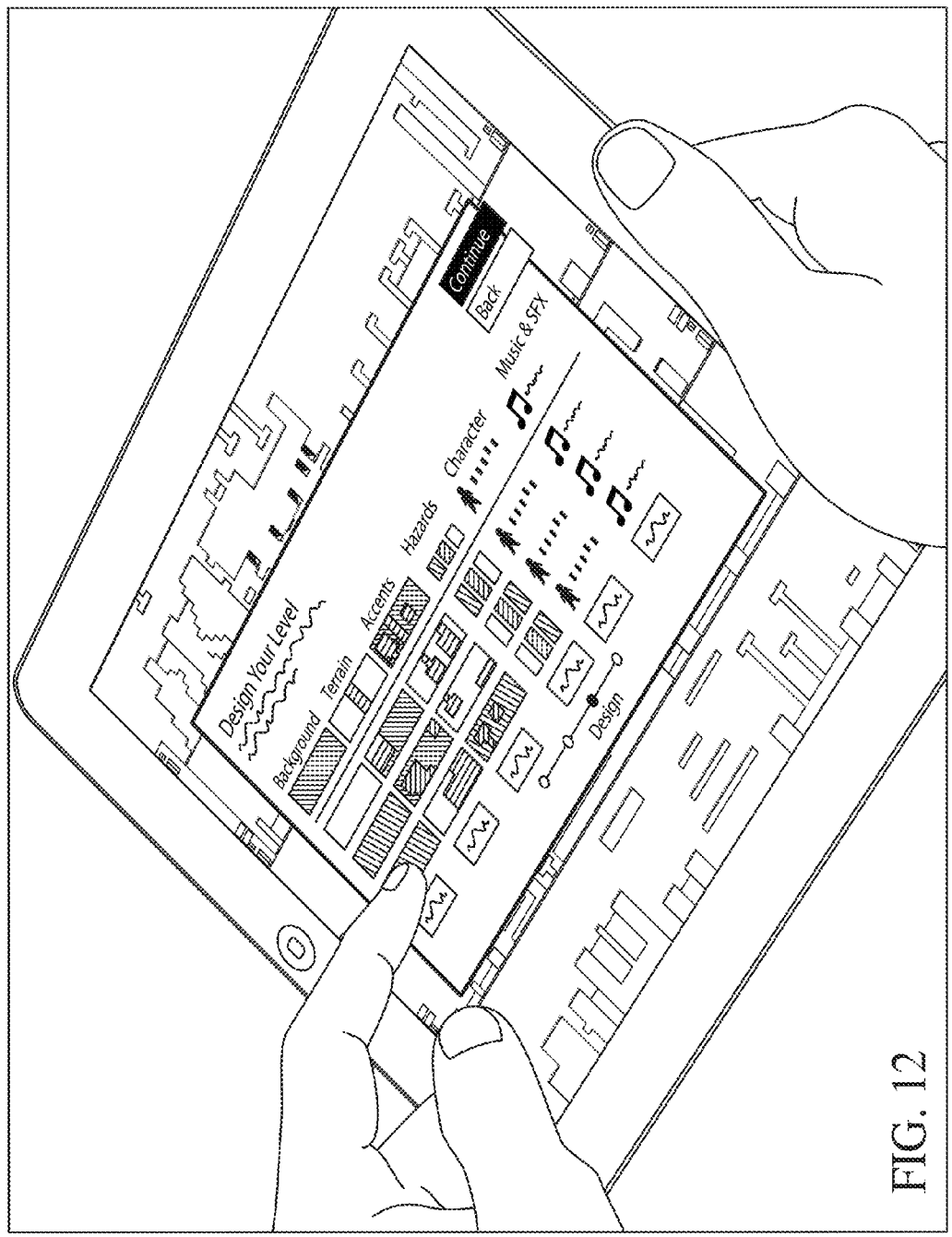
FIGS. 12-13 depict an embodiment of designing and/or customizing a generated game level.
Figure 13:
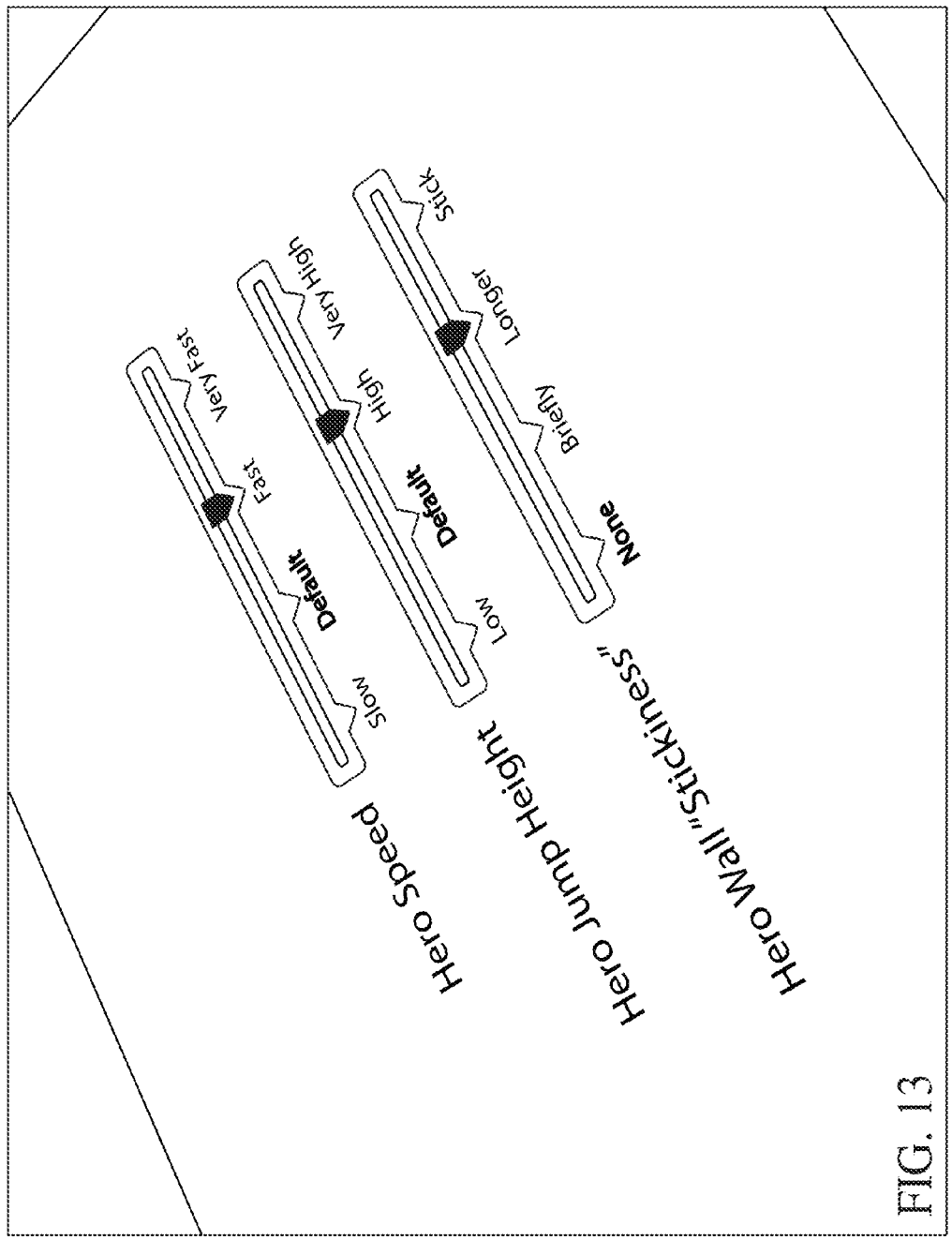
Figure 14:
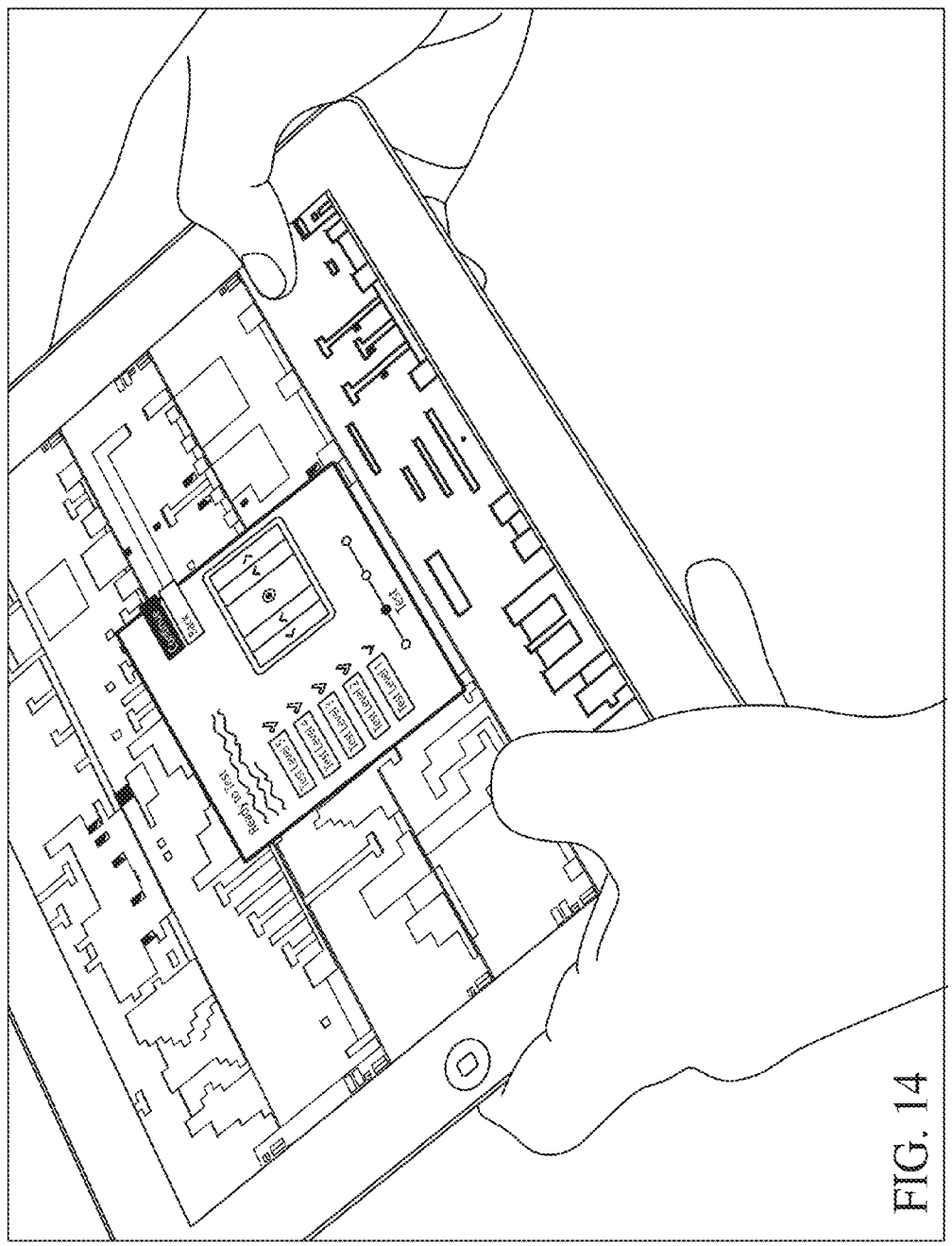
FIG. 14 depicts an embodiment of testing a generated game level.
Figure 15:
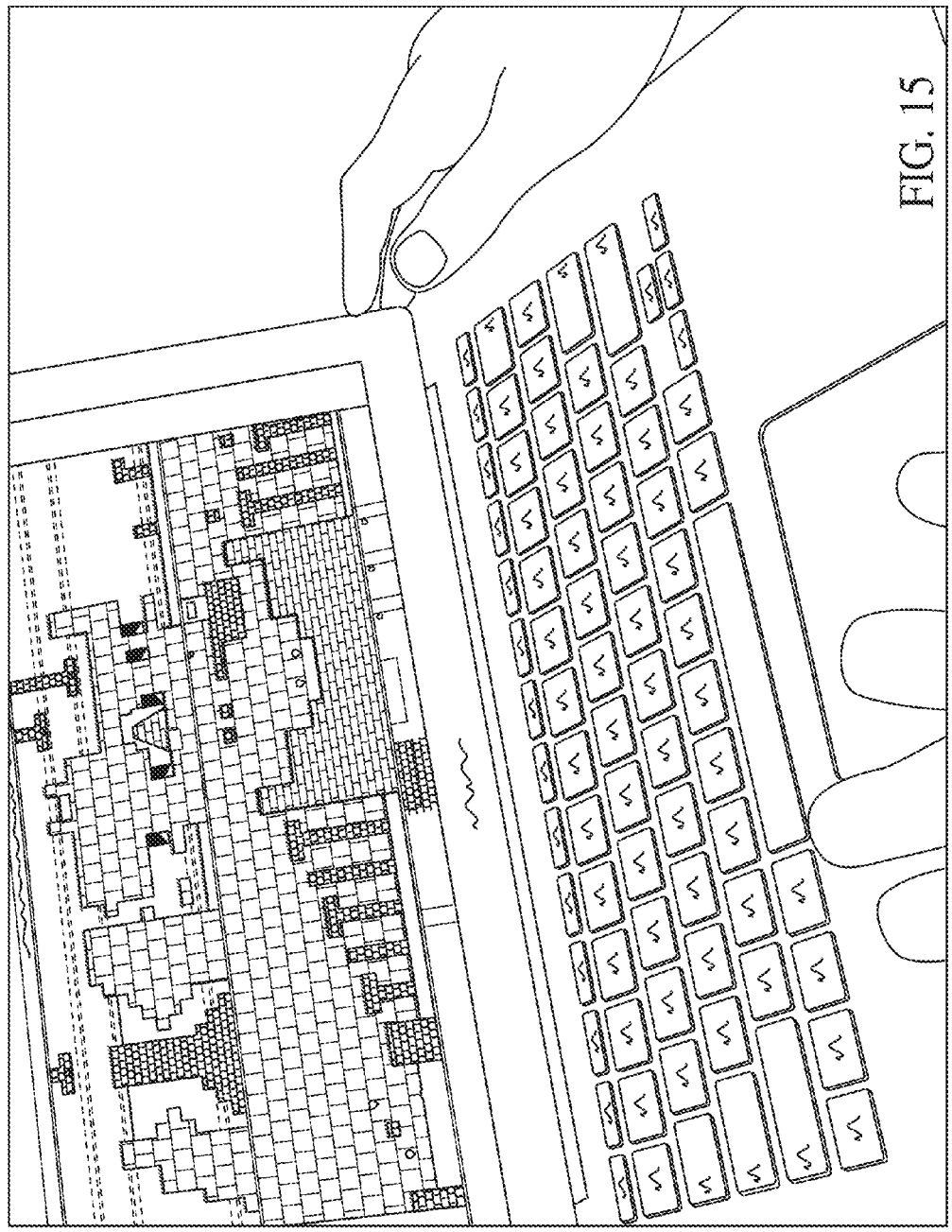
FIGS. 15-16 depict an embodiment of an application for viewing, editing, and/or playing a generated game level.
Figure 16:
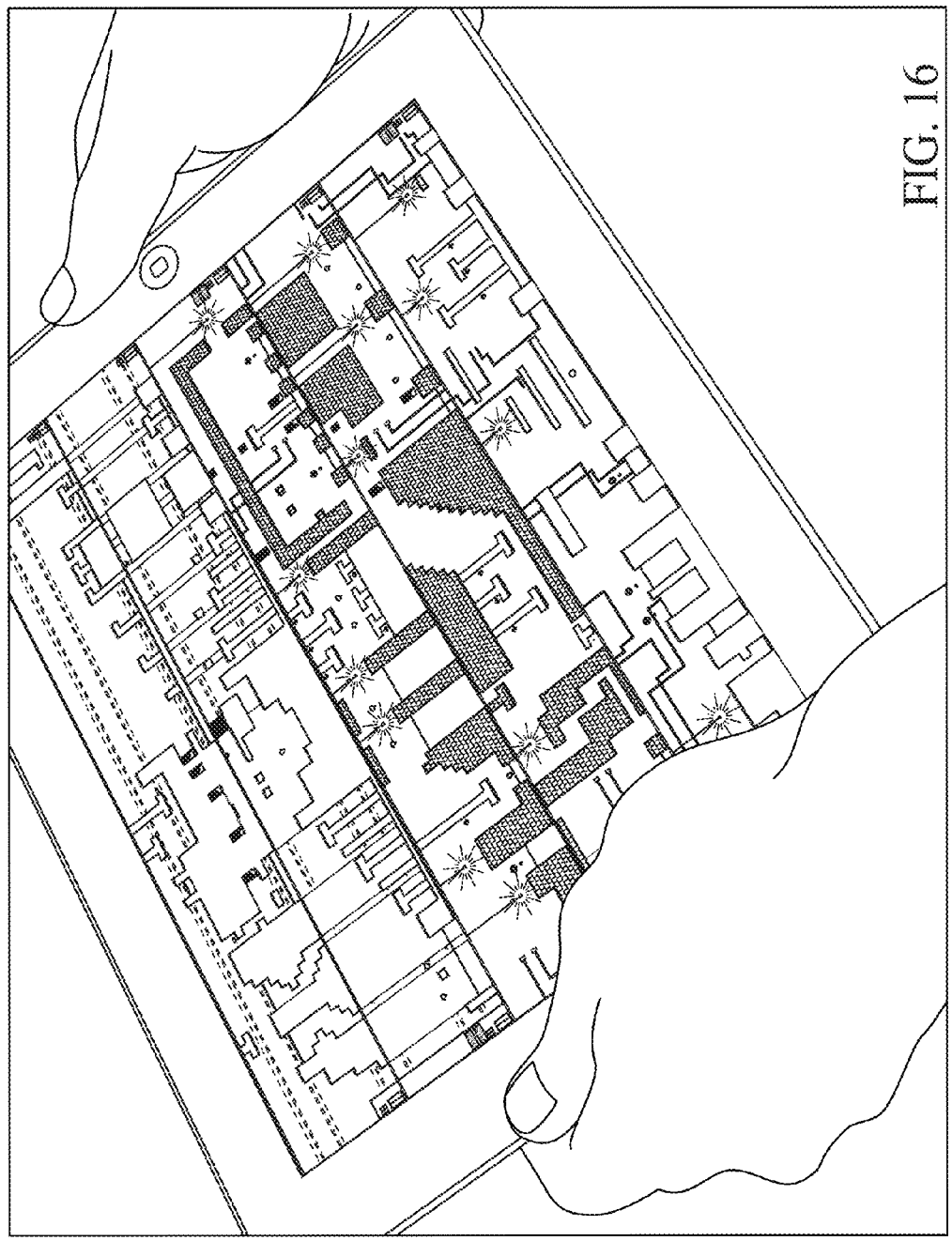
Figure 17:
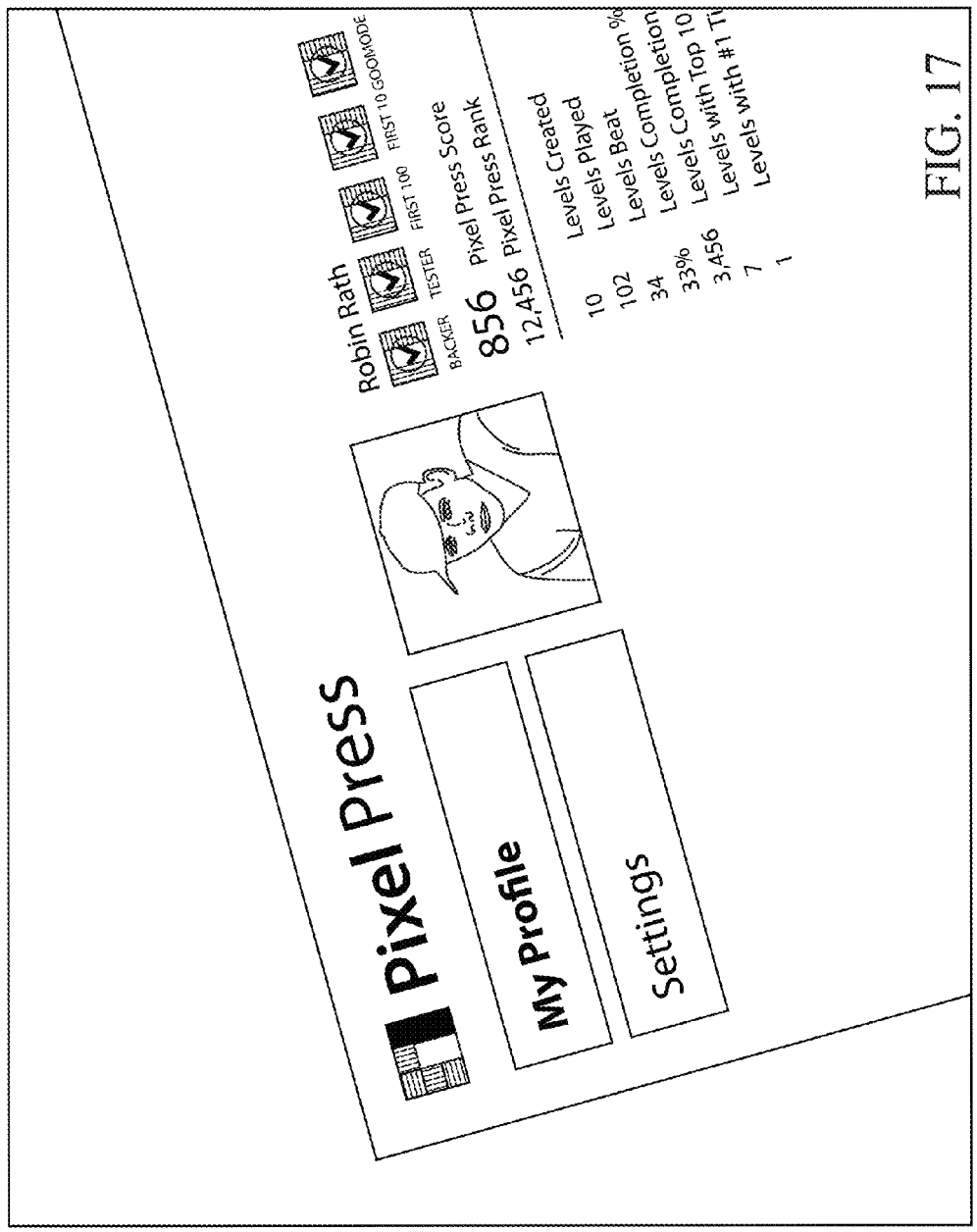
FIG. 17 depicts an embodiment having social networking features.

In an embodiment, the user may view, edit, and revise the video game level data, including but not limited to by drawing or re-drawing the level changing images, sounds, and music included in the generated game level. This may be done, among other reasons, to correct rendering or translation errors. Generally, the user performs these functions using a computer application, an embodiment of which is depicted in FIGS. 12 and 13. In an embodiment, the user may test the generated video game level data in an application, an embodiment of which is depicted in FIG. 14. The user may also view, play, or edit the generated level in an application, an embodiment of which is depicted in FIGS. 15 and 16. In an embodiment, a community feature facilitates level sharing and competition, including but not limited to through leaderboards, statistics, and integration into existing or future social networking platforms, and/or integrating social networking into the systems and methods. An embodiment of such an application is depicted in FIG. 17.

Also described herein is a system for creating a playable video game from a real-world model comprising, such as the system depicted in FIG. 19. In the depicted system, the system comprises a computer (1901) comprising software (1905) comprising one or more modules, a non-transitory computer-readable storage media (1921), and an image processing system (1903). In the depicted embodiment, the modules comprise a preprocessing module (1907), a recognizer module (1909), a semantic module (1911), and an accumulation module (1913). The depicted image processing system (1903) is a peripheral digital camera but in an embodiment, and as described elsewhere herein, the image processing system (1903) may be a different imaging system, and may be integrated into a computer. The image processing system (1903) may alternatively be, among other things, a peripheral or third-party device, including but not necessarily limited to a three-dimensional scanner which communicates with the computer (1901) and transmits or causes to be transmitted captured image data to the computer (1901). In a further embodiment, the image processing system (1903) is as the Microsoft Kinect™.

It should be noted that the depicted embodiments of FIGS. 21A and 21B have several advantages. First, the grid language can be simplified because the color of the blocks (1919) imparts additional meaning. This allows the grid language to be primarily chromatic in nature, with pictographic glyphs serving a more supplementary role. This can not only be more intuitive to users, who may more naturally associated colors with game literals, and thereby with functional elements (e.g., "brown" for ground and "blue" for water), but the process of arranging the game level requires a lower precision of fine motor skill. This enables younger users, who have sufficient fine motor school to place blocks but not to draw glyphs with sufficient precision, to use the system more effectively. The color-based glyph system also further enables younger users to use the system more effectively. The block-based system has other advantages as well, as spotted "bugs" or errors with the level design may be simpler. Further, in embodiments where the blocks differ chromatically but are generally the same shape and size, training and processing may be simpler and faster, and recognition may be more accurate.

The depicted embodiments of FIGS. 21A and 21B may also be implemented in expanded product offerings. By way of example and not limitation, users may simply use the blocks to draw pictures, with each sector or grid recess representing one pixel of the picture. This system can then be used so that younger users who, again, lack the fine motor skills to use a graphics editing program, can nevertheless create custom "skins" and icons for their games, or may simply use this feature as a generic image-creation tool for elementary graphic art design.

In an embodiment of the systems and/or methods described herein, the systems and/or methods further comprise displaying, conveying, or indicating to a user an image or representation of the based at least in part on preprocessed image data and/or glyph data. The systems and/or methods may further comprise editing or modifying preprocessed image data, glyph data, and/or semantic data based at least in part on user input provided to a computer system. In an embodiment, edited or modified preprocessed image data, glyph data, and/or semantic data may be produced or provided to a user in a non-digital format, including but not necessarily limited to by rendering or generating a recreation of the model. By way of example and not limitation, the systems or methods may display or render, or cause to be displayed or rendered, to the user a digital representation or impression of the model. The user may use editing software to modify the data, and/or the user may print or otherwise generate or create a modified hard copy of the model. For example, if an error occurs where a glyph is incorrectly recognized, the user may correct the glyph in the system, such as by changing the identity of the detected glyph, and then reprint the model based on the modified glyph data. Display and editing may be performed before, between, during, or after any method step or steps described herein.

In an embodiment, the model is not necessarily created by a user, but may be a pre-existing model. By way of example and not limitation, the model may be a terrain or satellite image of a geographic space, or a floor plan, and the glyphs may comprise geographic features. A user could thus use the systems and methods to create, for example, level data representative or indicative of the geography, or other features, of a real-world location, such as a neighborhood, building, or skyline.

In an embodiment, the systems and methods further comprise "splicing," wherein a model is segmented into a plurality of grids, sections, sectors, or markers, and each segment is processed separately and/or independently. Such segmentation may be done on a glyph-by-glyph basis, or may use larger segments comprising a plurality of glyphs. In such an embodiment, multiple datasets indicative of at least part of said model and/or glyphs thereon may be generated and/or processed together, separately, and/or independently or interdependently. In an alternative embodiment, splicing comprises combining data indicative of a plurality of models and/or glyphs into a single dataset indicative of a model or a unified model. This may be done in an embodiment by, for example, arranging or sequencing a plurality of models in a preferred or defined layout or manner and imaging the plurality of models as a single model. By way of example and not limitation, in an implementation for a top-down adventure game, such as a game in the spirit of The Legend of Zelda™, multiple models may be drawn and imaged to represent each room of a dungeon or each section of the overworld. These models may be linked or joined in the video game level data into a cohesive video game level or video game world, such as by examining glyphs on the models indicating the relationship between different models, or using computerized editing tools to arrange the multiple models appropriately to generate the desired world.

By way of example and not limitation, a user may draft multiple game level models, image and process each model as provided herein, edit and refine each processed image, such as to correct errors and make modifications, reprint the modified model, arrange the printed models in proper sequence, and then re-imagine the sequenced levels as a single model.

While this invention has been disclosed in connection with certain preferred embodiments, this should not be taken as a limitation to all of the provided details. Modifications and variations of the described embodiments may be made without departing from the spirit and scope of this invention, and other embodiments should be understood to be encompassed in the present disclosure as would be understood by those of ordinary skill in the art.

The invention claimed is:

1. A system for creating a playable video game comprising:
- a plurality of generally cubic blocks, each block in said plurality of generally cubic blocks having generally the same dimensions;
- a game level design board comprising a plurality of recesses arranged in a grid, each one of said plurality recesses sized and shaped to accommodate one generally cubic block in said plurality of generally cubic blocks;
- an imaging system capturing an image of said game level design board having a first generally cubic block in said plurality of generally cubic blocks disposed in a first recess thereof, said first generally cubic block being a symbolic representation of a first functional video game element in said playable video game, and said first functional video game element being defined functionally with respect to interaction of a player of said playable video game with such first functional video game element in said playable video game; and
- a non-transient computer-readable medium having computer-readable program instructions embodied thereon, said instructions comprising:
  - a preprocessing module generating preprocessed image data based at least in part on said captured image of said game level design board;
  - a recognition module iteratively parsing said preprocessed image data and during an iteration identifying in said preprocessed image data one or more data patterns indicative of said first generally cubic block disposed in said first recess, and generating glyph data indicative of said first generally cubic block and location of said first recess on said game level design board;
  - a semantic module iteratively parsing said glyph data and during at least one iteration translating said first generally cubic block indicated in said glyph data to said first functional video game element according to a pre-defined glyph language and generating semantic data indicative of said first functional video game element and the location of said first recess on said game level design board; and
  - an accumulator module generating video game level data based at least in part on said semantic data, said video game level data being in a format usable by a video game engine to render said playable video game and said video game level data adapted to cause said video game engine to implement said first functional video game element at a location in said playable video game corresponding to said location of said first recess on said game level design board.

2. The system of claim 1, wherein said video game level is a platformer level.

3. The system of claim 1, wherein said image processing system is a digital camera integrated into a computer, said computer including said computer-readable medium.

4. The system of claim 3, wherein said computer is a tablet computer.

5. The system of claim 1, wherein:
- said game level design board has a second generally cubic block in said plurality of generally cubic blocks disposed in a second recess thereof, said second generally cubic block being a symbolic representation of a second functional video game element in said playable video game, and said second functional video game element being defined functionally with respect to interaction of player of said playable video game with such second functional video game element in said playable video game;
- said recognition module further identifies in said preprocessed image data one or more data patterns indicative of said second cubic block disposed in said second recess, and said generated glyph data is further indicative of said second generally cubic block and the location of said second recess on said game level design board;
- said semantic module further translates said second generally cubic block indicated in said glyph data to said second functional video game element according to said pre-defined glyph language and based at least in part on the identity of said first functional video game element and said generated semantic data is further indicative of said second functional video game element and the location of said second recess on said game level design board;
- said video game level data is further adapted to cause said video game engine to implement said second functional video game element a location in said playable video game corresponding to said location of said second recess on said game level design board.

6. The system of claim 5, wherein said one or more data patterns indicative of said first generally cubic block is indicative of a color of said first generally cubic block, and wherein said one or more data patterns indicative of said second generally cubic block is indicative of a color of said second generally cubic block.

7. The system of claim 6, wherein said indicated color of said first generally cubic block is generally in the same color family as the indicated color of said second generally cubic block.

8. The system of claim 6, wherein said indicated color of said first generally cubic block is generally in a different color family than the indicated color of said second generally cubic block.

9. The system of claim 1, wherein said preprocessed image data is generated from said raw image data using at least one image transformation selected from the group consisting of: straightening; aligning; orienting; reducing distortions; reducing image artifacts; sharpening; adjusting color, hue, shadow, tone, lighting, or contrast, cropping, and combinations of one or more of these.

* * * * *